(12) United States Patent
Roskind

(10) Patent No.: US 10,445,136 B1
(45) Date of Patent: Oct. 15, 2019

(54) RANDOMIZED SUBREQUEST SELECTION USING REQUEST-SPECIFIC NONCE

(71) Applicant: Amazon Technologies, Inc., Seattle, WA (US)

(72) Inventor: James Roskind, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/611,091

(22) Filed: Jun. 1, 2017

(51) Int. Cl.
- *G06F 9/46* (2006.01)
- *G06F 9/48* (2006.01)
- *G06F 9/50* (2006.01)

(52) U.S. Cl.
CPC ............ *G06F 9/4881* (2013.01); *G06F 9/505* (2013.01); *G06F 2209/5022* (2013.01)

(58) Field of Classification Search
CPC . G06F 9/4881; G06F 9/505; G06F 2209/5022
See application file for complete search history.

(56) References Cited

U.S. PATENT DOCUMENTS

| | | | | |
|---|---|---|---|---|
| 7,860,053 | B1 * | 12/2010 | Ho | H04W 74/006 370/329 |
| 8,141,051 | B2 * | 3/2012 | Huang | G06F 11/3409 717/127 |
| 8,321,955 | B2 | 11/2012 | Feng et al. | |
| 2001/0014928 | A1 * | 8/2001 | Chrysos | G06F 9/3802 710/244 |
| 2002/0004846 | A1 * | 1/2002 | Garcia-Luna-Aceves | G06F 12/1483 709/245 |
| 2014/0133656 | A1 | 5/2014 | Wurster et al. | |

* cited by examiner

*Primary Examiner* — Camquy Truong
(74) *Attorney, Agent, or Firm* — Robert C. Kowert; Meyertons, Hood, Kivlin, Kowert & Goetzel, P.C.

(57) ABSTRACT

Methods and related systems are provided for the generation and use of a request-specific nonce to coordinate the randomized selection of subrequests stemming from a top-level request to a system. The method includes receiving, but a subsystem of the system, a subrequest that is generated in response to the receipt of a top-level request to the system. The subsystem then determines a nonce that comprises a pseudorandom value that is consistent for all subrequests stemming from the top-level request. The subsystem may use the nonce to make a variety of processing decisions for the subrequests. In one embodiment, the nonce is used to determine which subrequests should be throttled. In another embodiment, the nonce is used to determine whether trace data should be collected for received subrequests. The nonce allows different subsystems to coordinate their processing decisions based on a randomized but consistent prioritization of the top-level request.

20 Claims, 9 Drawing Sheets

RANDOMIZED SUBREQUEST SELECTION USING REQUEST-SPECIFIC NONCE

BACKGROUND

A system that provides services to clients may implement some mechanism to protect itself from a crushing load of service requests that could potentially overload the system. For example, for a web-based service or remote procedure call (RPC) service, the service provider system is considered to be in an "overloaded" state if it is not able to provide an expected quality of service for some portion of client requests it receives. One solution employed by service provider systems to deal with request overload is to deny service to throttle a certain proportion of incoming client requests until the system recovers from the overloaded state.

In some systems, throttling may be implemented in a pseudorandom fashion to reduce loads by returning failure results to random requests. In larger systems, throttling may be implemented separately for different subsystems of the system. For example, an e-commerce website may implement a number of backend application servers, each of which is associated with a different function and a different throttling policy. In such a system, a single top-level request, such as a page load directed to a web server, may induce numerous subrequests to a subsystem. When overloaded, the subsystem may simply throttle subrequests randomly. However, random throttling of just a small percentage of subrequests may induce a much larger effective throttling rate for top-level requests.

Moreover, large scale service provider systems are often implemented using collections of software modules that may be developed by different teams, sometimes in different programming languages, and could span thousands of compute nodes across multiple physical locations. Tools that aid in understanding system behavior and reasoning about performance issues are invaluable in such environments. Some of these tools implement facilities to generate, capture, and log trace data that reflect the operation flow of a system during the servicing of a request. Trace data may include, for example, messages generated by the system modules, the state of a call stack during execution, and certain operational metrics, such as execution time.

In these large system, traces may be acquired via a pseudorandom sampling of subrequests handled in each subsystem. In some cases, the sampling rates may vary based on the subsystem. In systems where the subsystems independently collect trace samples of random subrequests, it is extremely unlikely that a complete trace (i.e., all transactions on all subsystem interactions that result from a single top-level request) will be captured, even where the sampling percentage for each subsystem is relatively high. This problem thus prevents a complete review of the system's behavior in the handling of a top-level request.

Figure 1:
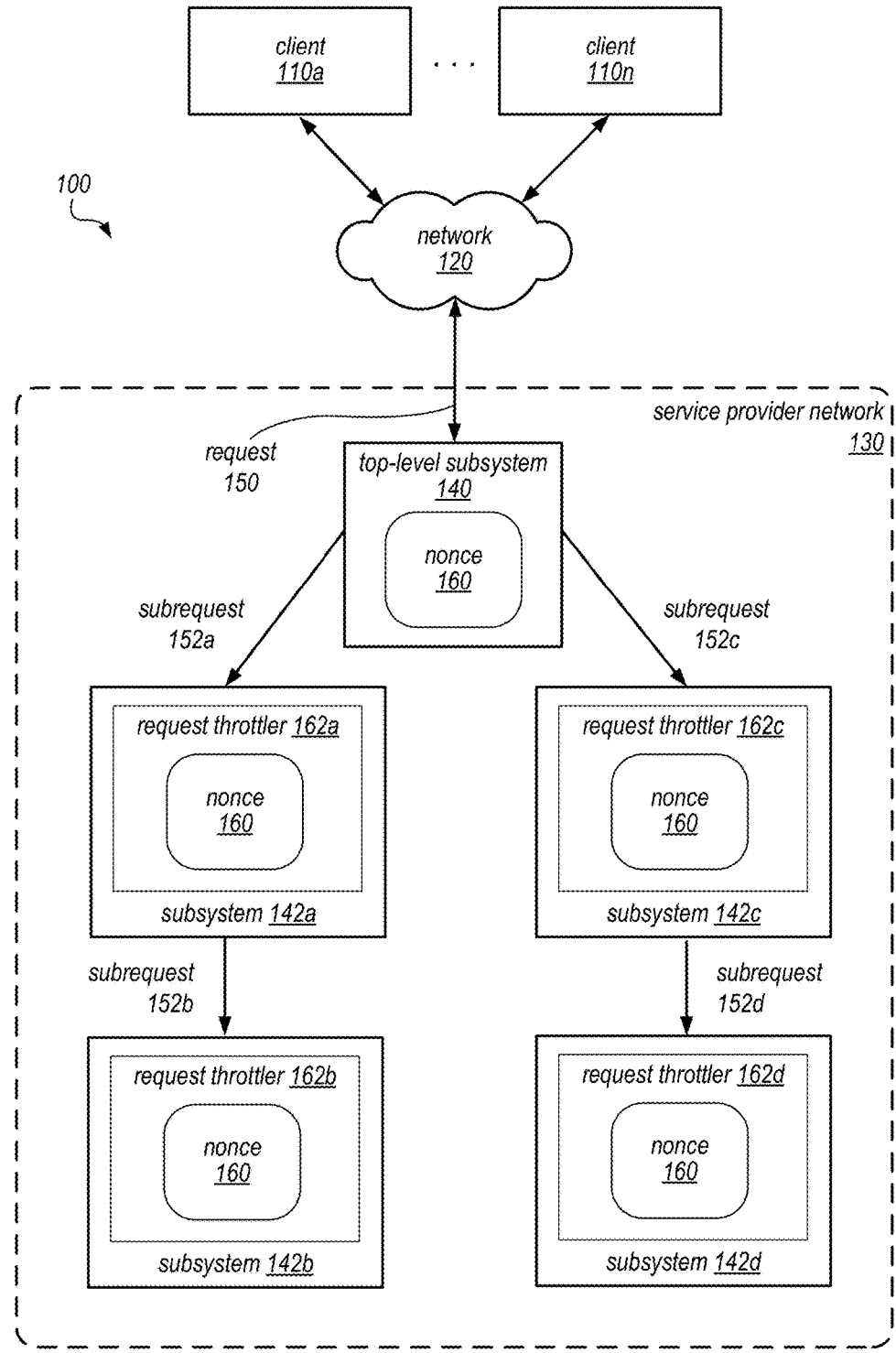
FIG. 1 is a block diagram illustrating an example computer system that employs a request-specific nonce to selectively throttle subrequests, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to generate a request-specific nonce for a request directed to a service provider system. The nonce may be used by different subsystems of the service provider system to coordinate the selection of subrequests in some context, as describe below.

In large scale systems that include different subsystems, a single top-level request directed to the system may generate a number of subrequests to the various subsystems. In some cases, the subsystem may need to select a subset of received subrequests in a pseudorandom selection, based on a selection policy that is particular to the subsystem. For example, in one system, each subsystem may implement a different policy to randomly throttle received subrequests, depending on the current state of each subsystem. As another example, each subsystem may implement a different policy that dictates whether trace data should be collected for received subrequests. In some embodiments, the subsystems perform these selections independently, without any form of coordination. This lack of coordination often leads to suboptimal results. For example, in some embodiments, the failure of any subrequest will cause a failure of the top-level request. Thus, as can be understood, uncoordinated throttling of subrequests by the different subsystems, even at low percentages, may cause a high failure rate at the top-level. As another example, in systems where the subsystems independently sample trace data, uncoordinated collection of trace data at the subrequest level will generate mostly incomplete traces of the top-level requests.

In some cases, the subsystems perform these selections independently, without any form of coordination. This lack of coordination often leads to suboptimal results. For example, in some cases, the failure of any subrequest will cause a failure of the top-level request. Thus, as can be understood, uncoordinated throttling of subrequests by the different subsystems, even at low percentages, may cause a high failure rate at the top-level. As another example, in systems where the subsystems independently sample trace data, uncoordinated collection of trace data at the subrequest level will generate mostly incomplete traces of the top-level requests.

Thus, according to some embodiments disclosed herein, a request-specific nonce is generated for a top-level request, and effectively shared among the various subsystems to select subrequests in a coordinated fashion. In some embodiments, the nonce may be generated based on one or more parameters associated with the request, such as for example, a client identifier, a session identifier, or a client network address, etc. Effective sharing of the nonce may include explicit sharing, for example passing the nonce as part of the subrequest, or sharing of data sufficient to consistently calculate the nonce. In some embodiments, the consistent nonce may be computed in part from a server provided value, such as a time signal, and/or a secondary constant. In some embodiments, the nonce may be constructed by a hashing algorithm, which generates an effectively pseudo-random value.

In some embodiments, a throttling subsystem may use the nonce to randomly select a percentage of subrequests to throttle. For example, the throttling subsystem may compare the nonce with a throttling cutoff threshold to determine whether to throttle the subrequest. Likewise, in some embodiments, a tracing subsystem may use the nonce randomly select a percentage of subrequests to trace. The tracing subsystem may compare the nonce with a cutoff threshold to determine whether the subrequest should be traced. By sharing a common selection technique across all subsystems in the system, the systems can coordinate their respective selection of subrequests to control the amount of top-level requests that are impacted by the random selections of subrequests at the subsystem level. For example, random throttling at the subsystem level may be coordinated to ensure that the throttling of each subsystem overlap as much as possible, so as to minimize the impact to top-level requests. As another example, random trace collection at the subsystem level may be coordinated to maximize the number top-level requests that are completely traced. In some embodiments, the nonce may be scaled onto the range of numbers, for example, between 0 and 99. The cutoff threshold for throttling or tracing subrequest may be specified in accordance with the range. For example, a subsystem may use to nonce to throttle all subrequests having a nonce value of less than 10 (out of 100), and to trace data for all subrequests having a nonce value of greater than 90 (out of 100).

As can be appreciated by those skilled in the art, use of the nonce provides a number of benefits. First, the nonce associates the subrequest and the top-level request. This ensures that selection decisions for all subrequests stemming the same top-level request are treated similarly for selection purposes. Thus, for example, all subrequests of a single top-level request are collectively throttled, or not, based on the nonce. Second, since the nonce is consistent for a given top-level request across the entire system, it allows for a degree of coordination across the subsystems. For example, two throttling subsystems may use a common subrequest selection technique based on the common nonce to prioritize the range of top-level requests the same way. For example, the two throttling subsystems may agree that all subrequests having nonce values in the bottom 10% should be prioritized in the bottom 10% for selection purposes. This coordination allows for a higher survival rate of top-level requests in the throttling of subrequests. Likewise, two tracing subsystems may coordinate to trace subrequests for only particular subrange of nonce values, thereby producing more complete traces of top-level requests associated with those nonce values. Thus, the nonce encapsulates a randomized but consistent prioritization of the top-level requests at the level of subsystems, so that any randomized subrequest selection decisions at the subsystem level may be made by some common subrequest selection technique based on the nonce, e.g., comparing the nonce to a fixed threshold.

In some embodiments, a time signal (for example a timestamp) may be used to generate the nonce. The timestamp may be quantized into predefined time intervals, such as every 5 minutes. Thus, in some embodiments, the timestamp may be an integer that ranges from 0 to 11, corresponding to the 5-minute intervals within the hour. A nonce generation function may be applied to this quantized timestamp as a parameter to generate the nonce value, such that different values of the quantized timestamp will generate different values for the nonce. The injection of this time-dependent variable into the nonce value means that the request nonce values for any given client will change with each new time interval, ensuring that the same client will not be repeatedly throttled by the service provider over multiple intervals. In some embodiments, when a client request is throttled, the service provider may provide a message to the client, indicating to the client to retry to request after passage of the time interval, when the nonce value will be changed. These and other features and benefits of the inventive system and method are described in more detail below, in connections with the figures.

FIG. 1 is a block diagram illustrating an example computer system that employs a request-specific nonce to selectively throttle subrequests, according to some embodiments. As illustrated, the computer system 100 may include one or more clients 110*a* to 110*n*, which may communicate over a network 120 with a service provider network 130. The service provider network 130 may provide computing resources via one or more computing services to clients 110 over network 120.

The service provider network 130 may be operated by an entity to provide one or more services, such as various types of cloud-based computing or storage services, accessible via the Internet and/or other networks to clients 110. In some embodiments, the service provider network 130 may implement a web server, for example hosting an e-commerce website. Service provider network 130 may include numerous data centers hosting various resource pools, such as collections of physical and/or virtualized computer servers, storage devices, networking equipment and the like, needed to implement and distribute the infrastructure and services offered by the service provider network 130. In some embodiments, service provider network 130 may provide computing resources to clients. These computing resources may in some embodiments be offered to clients 110 in units called "instances," such as virtual machine instances.

Virtual machine instances are one example of virtual computing resources. The virtual computing resources may be hosted on a virtualization host. A virtualization host may be one or more physical computing devices. The physical computing devices are an example of physical computing resources. A virtualization host may include a virtualization management module capable of instantiating and managing a number of different client-accessible virtual computing resources. The virtualization management module may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

The clients 110 may encompass any type of client configurable to submit requests to the service provider network 130. For example, a given client 110 may include a suitable version of a web browser, or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 110 may be configured to generate network-based services requests according to a Representational State Transfer (REST)-style network-based services architecture, a document- or message-based network-based services architecture, or another suitable network-based services architecture. In some embodiments, the service provider network 130 may offer its services as web services, and the clients 110 may invoke the web services via published interfaces for the web services. In some embodiments, a client 110 (e.g., a computational client) may be configured to provide access to a computing service 130 in a manner that is transparent to applications implemented on the client 110 utilizing computational resources provided by the service provider network 130.

The clients 110 may convey network-based services requests to the service provider 130 via network 120. In various embodiments, network 120 may encompass any suitable combination of networking hardware and protocols necessary to establish network-based communications between clients 110 and service provider network 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the service provider network 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network 130. In some embodiments, clients 110 may communicate with service provider network 130 using a private network rather than the public Internet.

The services offered by the service provider network 130 may include a variety of types of services that allows clients 110 to use computing resources in the service provider network 130 for a variety of purposes. In some embodiments, the services may be RPC or web-based services. In some embodiments, the service provider network 130 may implement a web server that responds to web-based requests. For example, the service provider 130 may implement an e-commerce website that allows clients 110 to purchase goods and services from one or more e-commerce vendors. In some embodiments, the services may be part of a software-as-a-service (SaaS) platform, that provides a variety of traditional on-premises services from a remote data center in the cloud. The services can, for example, provide access to generic compute instances. The services can also provide access to specialized compute instances with specialized functionality, such as routers, domain name systems (DNSs), load balancers, desktop virtualization servers, and the like. The services may include various types of storage services that expose different types of storage access interfaces, including block-based storage services, relational database services, NoSQL database services, file system services, and the like. The services may also include services that provide functionalities of commonly used software modules, which can be used in conjunction with other software to implement larger systems. For example, the services may include queuing services, notification services, logging services, key storage and management services, and the like. The services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services generally operate on computing resources of the service provider network 120, and may be controlled and configured by clients 110 via various interfaces such as graphical user interface (GUI) (e.g., as part of an administration control panel or web site) and/or as a programmatic interface such as an Application Programming Interface (API).

As shown, the service provider network 130 may include a number of subsystems, such as subsystems 140 and 142a-d. In some embodiments, one subsystem, for example subsystem 140, may be a top-level subsystem. The top-level subsystem 140 may act as a client-interfacing system, configured to provide the public interface of a service provided by the service provider network 130. In some embodiments, multiple subsystems may implement functionality to interface directly with clients. In some embodiments, the top-level subsystem 140 may comprise a web server that receives web-based request from clients 110. Subsystem 140 may include a number of servers or compute nodes, which may be load balanced by a load balancing system.

The subsystems 140 and 142 in the service provider network 130 may comprise a variety of different groupings or categories of computing resources. For example, in some embodiments, a subsystem 140 or 142 may be a single server or a compute node that handles a particular type of request. In some embodiments, a subsystem may include a group of machines, or a cluster of compute nodes. In some embodiments, a subsystem 140 or 142 may implement a particular function or group of functions, which may be exposed to other subsystems in the service provider 130 as internal services. As one example, the service provider network 130 may provide a storage service to the clients 110. The storage service may include subsystem and/or subservices, such as one or more client-interfacing subsystems to receive different types of query requests, a backend storage subsystem that interfaces with the underlying storage hardware, a recovery subsystem that maintains the necessary metadata to guarantee writes to the storage service and reproduce the writes in the event of a failure, a performance monitoring service that monitors various metrics generated by the other subsystems, a provisioning subsystem that allocates storage space or instantiates compute nodes in response to data store object creation requests, and/or an billing subsystem that keeps track of usage of the storage service by different clients 110 and generate bills for the clients 110.

As another example, in an e-commerce website, the website may include a group of web servers as a top-level subsystem, a group of application servers as a middle tier subsystem, and a group of database servers as a backend subsystem. In some embodiments, the application servers may be divided into additional subsystems according to their function and/or geographical location. For example, in some embodiments, a first subsystem may generate a shopping cart to allow a client to complete a transaction on the e-commerce website. The first subsystem may rely on other subsystems to perform subtasks, such as determining the delivery options and/or costs, determining prices for the items in the shopping cart, determining any rewards available to the client, generating advertising for additional goods or services to the client, etc. In some embodiments, some of the subsystems may be divided by location. For example, each subsystem may be associated with a different fulfillment center, which may be chosen based on the location of the client.

In some embodiments, in order to service a top-level request, such as request 150 from a client 110, the service provider network 130 may generate a number of subrequests 152a-d among its subsystems 142a-d. The subrequests 152 may be calls made via predetermined call interfaces, such as web service or RPC APIs, or generalized messages communicated via a messaging protocol, or dispatched in any of a variety of call methods. In some cases, one subsystem may generate a large number of subrequests to another subsystem. In some cases, the subrequests may be circular, in which a calling subsystem may receive subrequests from a called subsystem as a result of its own subrequest. In some embodiments, a failure of a subrequest may cause the failure of the parent request. In some embodiments, a failure of a single subrequest 152 may cause the failure of the entire top-level request 150.

For example, in the case where the service provider network 130 implements an e-commerce website, a top-level request 150 may be received from a client 110 to proceed to checkout with a shopping cart of selected products. In this example, a top-level subsystem 140, which may be a web server in the e-commerce website, may initially receive the request 150. In response to the request 150, the web server may issue subrequests 152a and 152c to subsystems 142a and 142c, to construct elements of a series of response webpages to the client 110. For example, subsystem 162a may construct a first webpage that indicates a listing of the items in the shopping cart, along with the indicated numbers of purchase and prices. The subsystem 162a may issue another subrequest 152b to another subsystem 142b, to determine the prices of the items, which may take into account any rewards or attributes of the client 110 or contents of the shopping cart. Subsystem 142c may be called upon to generate a delivery information webpage to the client 110. Subsystem 142c may generate another subrequest 152d to subsystem 142d, to determine the costs of various delivery options of the items in the shopping cart, which may require examining the metadata for the items, such as the weight of the items. In this example, some of the subsystems maybe called multiple times. For example, subsystem 142 that computes the delivery cost of an item may be called once for each item in the shopping cart. In this example, the failure of any subrequest generated by the top-level checkout request 150 may cause a failure of the entire checkout request. In some embodiments, the calling subsystem may attempt a number of retries before abandoning a subrequest and issuing its own failure. In some embodiments, a calling subsystem may throttle its request in response to receiving a throttle from one of its called subsystems.

In some embodiments, some subsystems 142 of the service provider network 130 may implement request throttlers 162a-d. In some embodiments, throttling is provided to protect a subsystem 142 from a crushing load of service requests that could potentially overload the subsystem. A subsystem may be considered to be in an "overloaded" state if it is not able to provide the expected quality of service for some portion of client requests it receives. In the event of an overloaded state, the request throttlers 162 may deny service to clients 100 or throttle a certain number of incoming requests until the subsystem get out of the overloaded state.

In some embodiments, the request throttlers 162 may each implement its own throttling policy. In some embodiments, a subsystem 142 may simply begin to ignore subrequests when a certain number of subrequests are received within a time window. In some embodiments, a throttler 162 may pseudo-randomly drop some proportion of subrequests when an "overloaded" state is reached. The throttler 162 may continue to drop subrequests until the subsystem 142 is no longer in an overloaded state.

In some embodiments, the proportion of throttled subrequests may vary based on the severity of the overloaded state. For example, a throttler 162 may effectively throttle 10% of the subrequests to a subsystem when the subsystem is mildly overloaded, and effectively throttle 20% of the subrequests when the subsystem is severely overloaded. In some embodiments, the throttler 162 may maintain an effective cutoff for throttling subrequests to pseudo-randomly drop subrequests in an overloaded state. In some embodiments, pseudo-random dropping may be based on a prioritization-of-dropping ordered by a nonce. The cutoff may be implemented as a percentage of subrequests, or in some embodiments, as an absolute number of subrequests. For example, a subsystem 142 may implement a subrequest queue for a certain size, and begin to randomly throttle subrequests above a certain cutoff size. In some embodiments, the cutoff may be computed based on other factors, such as the expected processing time for the subrequests. Thus, one throttler 162 may implement a cutoff of 100 milliseconds (or based on some other work unit), and randomly throttle subrequests beyond the cutoff.

As shown, each subsystem 142 in the figure implements its own independent request throttler 162. Although shown as separate modules in the figure, in some embodiments, the request throttler 162 may be implemented as a single module, or a separate subsystem, that is shared by the other subsystems 142. In some embodiments, each subsystem 142 may implement its own request throttling policy, such that different types of subrequests 152 are throttled differently, based on the current state of the handling subsystem 142. For example, a subsystem 142*d* that computes delivery costs for items may throttle requests based on its own current load. As another example, each throttler 162 may maintain a throttle cutoff for throttling its subrequests.

In some embodiments, the service provider network 130 may share among its subsystems a nonce value 160 that may be consistently obtained by all subsystems for all subrequests 152 stemming from a top-level request 150. For example, in some embodiments, the nonce may be obtained via a nonce determination technique that provides a consistent pseudorandom nonce value for subrequests stemming from a same top-level request. The nonce determination technique may be used by all subsystems, and allow the nonce 160 to be obtained by a variety of methods, depending on the embodiment. For example, in some embodiments, the nonce 160 may be passed from subsystem to subsystem as an explicit parameter in the subrequests 152. In some embodiments, the nonce 160 may be included in the web service call as part of the web service call header. In some embodiments, the nonce 160 may be generated in one subsystem using a known and consistent nonce generation function and a set of parameters that is invariant for all subrequests stemming from a top-level request, and then regenerated at a different subsystem using the same nonce generation function and the same set of parameters. In some embodiments, the service provider network 130 may implement nonce manager that maintains the nonce. The nonce manager may be implemented as a separate module, or as a part of each subsystem 142, or some subset of the subsystems 142. In some embodiments, the nonce manager may be implemented as part of the top-level subsystem 140. In some embodiments, the nonce manager may be implemented as part of a dispatcher or load balancer of the service provider network 130, and generate a nonce as the request is dispatched or forwarded to the rest of the subsystems.

In some embodiments, the top-level subsystem 140 may generate the nonce for a received request 150. The generated nonce 160 may be a value that is generated based on one or more parameters associated with the request 150. In some embodiments, the nonce may uniquely identify all requests 150 received by the service provider network 130, within a period of time. In some embodiments, the nonce may be generated as a pseudorandom value within a range. For example, the nonce may be an integer from 0 to 99 that is randomly distributed in the range based on the input parameters. In some embodiments, the nonce may be computed from request parameters such as a client identifier, a session identifier, a source IP address, or a source TCP port number. In some embodiments, the nonce may be based on the type of request 150 that is received. In some embodiments, the nonce may be based on parameters that are not explicitly provided in the request 150. For example, the nonce may be based on a request identifier or transaction identifier generated for the request 150 by the service provider network 130. In some cases, the request or transaction identifier may be generated by a counter.

In some embodiments, the nonce may be generated based on a timestamp associated with the request 150, for example, the time that the request is received. The timestamp may be quantized in some embodiments, for example, based on discrete time intervals of 5 minutes. Thus, every request may be designated one of twelve 5-minute intervals during the hour. A nonce generation function may be used to generate the nonce using a number of parameters that includes the time quantization. Thus, different values of the time quantization may generate different values for the nonce. In some embodiments, the nonce may be generated using a hash function that hashes one or more of the above parameters into a value within the range.

In some embodiments, the subsystems may be able to generate the nonce independently based on a known and consistent generation function and known parameters. Thus, in some embodiments, the top-level subsystem 140 may not generate the nonce 160 at all. In some embodiments, a separate nonce manager may be responsible for generating the nonce. In some embodiments, the nonce may be generated by another module or subsystem in the service provider network 130, and the nonce manager may only be responsible for maintaining and distributing the nonce, during the pendency of the request 150. In some embodiments, after the request 150 is serviced by the service provider network (or failed), the top-level subsystem 140 may instruct the nonce manager to expire the nonce, as the request 150 is no longer live in the system. In some embodiments, the nonce manager may purge its nonce values periodically, after some specified period of time. For example, the nonce manager may assume that after 24 hours, a request nonce may be deleted.

In some embodiments, the nonce 160 may be unique to the top-level request 150. Thus, the nonce is a consistent value that may be reproduced by all subsystems in the service provider network 130 that handle subrequests generated from the top-level request 150, using the same set of parameters associated with the top-level request 150. However, in some embodiments, subsystems of the service provider network 130 may generate additional nonces that are designed to track other requests in the system. For example, in some embodiments, nonces may be generated for any subrequest in the service provider network 130, so that downstream subsystems from the subrequest may make coordinated decisions based on the nonce. In some embodiments, a nonce may be generated to track a client session that may span multiple client requests.

In some embodiments, the nonce 160 is generated in a pseudorandom fashion, so that it is evenly distributed in a normalized range. This randomization allows the nonce to be used by other subsystems to perform a randomized selection of subrequests based on the top-level request 150. However, in some embodiments, the nonce may be generated such that it is not evenly distributed in the range. Thus, the nonce generator may influence the selection decisions of the subsystems. For example, nonce generator may restrict the nonce for some requests to a value from 0 to 89, out of a full range of 0 to 99. This means that the nonce for these requests will not fall to the bottom ten percent, which may affect the selection decisions of the other subsystems.

In some embodiments, subsystems in the service provider network may determine whether to perform an operation for a subrequest using a shared selection technique that the subsystems to coordinate their throttling of subrequests to limit their impact to a minimal number of top-level requests.

For example, one shared selection technique may select a given subrequest if a given nonce obtained for that subrequest exceeds a selection parameter for a given subsystem, such as a throttling threshold for the first subsystem. In some embodiments, multiple subsystems may use the same nonce determination technique and subrequest selection technique, so that the subrequest selection decision may be coordinated across all subsystems to minimize the number of top-level requests that are impacted.

In some embodiments, the request throttlers 162 may use the nonce to determine whether to throttle the subrequests that they receive. Although each request throttler 162 may each implement its own throttling policy, the nonce generated for the top-level request 140 ensures that each throttler shares a common priority ranking of top-level requests. Because all subrequests from a single top-level request are associated with the same nonce value, they may be ranked the same by all of the subsystems. For example, the request throttlers 162 may use the nonce to coordinate the throttling decision by agreeing that all low ranking nonce values (bottom 10%, bottom 20%, etc.) should be throttled. This means that most of the throttling in the system will be focused on the same low-ranking top-level requests 140, and that other top-level requests 140 will not experience any throttling of their subrequests. The subrequests of the same top-level request will be treated consistently by all of the throttlers 162*a-d*. As may be understood, use of the nonce as described provides a means of coordination among the subsystems, such that the randomized throttling of subrequests are focused on a small handful of top-level requests, allowing the maximum amount of top-level requests to be serviced while at the same time meeting the throttling requirements of each subsystem. In some embodiments, the throttling by the different subsystems may be coordinated such that the overall throttling of top-level requests is limited to a proportion of top-level requests that is no larger than the throttling level at each of the subsystems.

Figure 2:
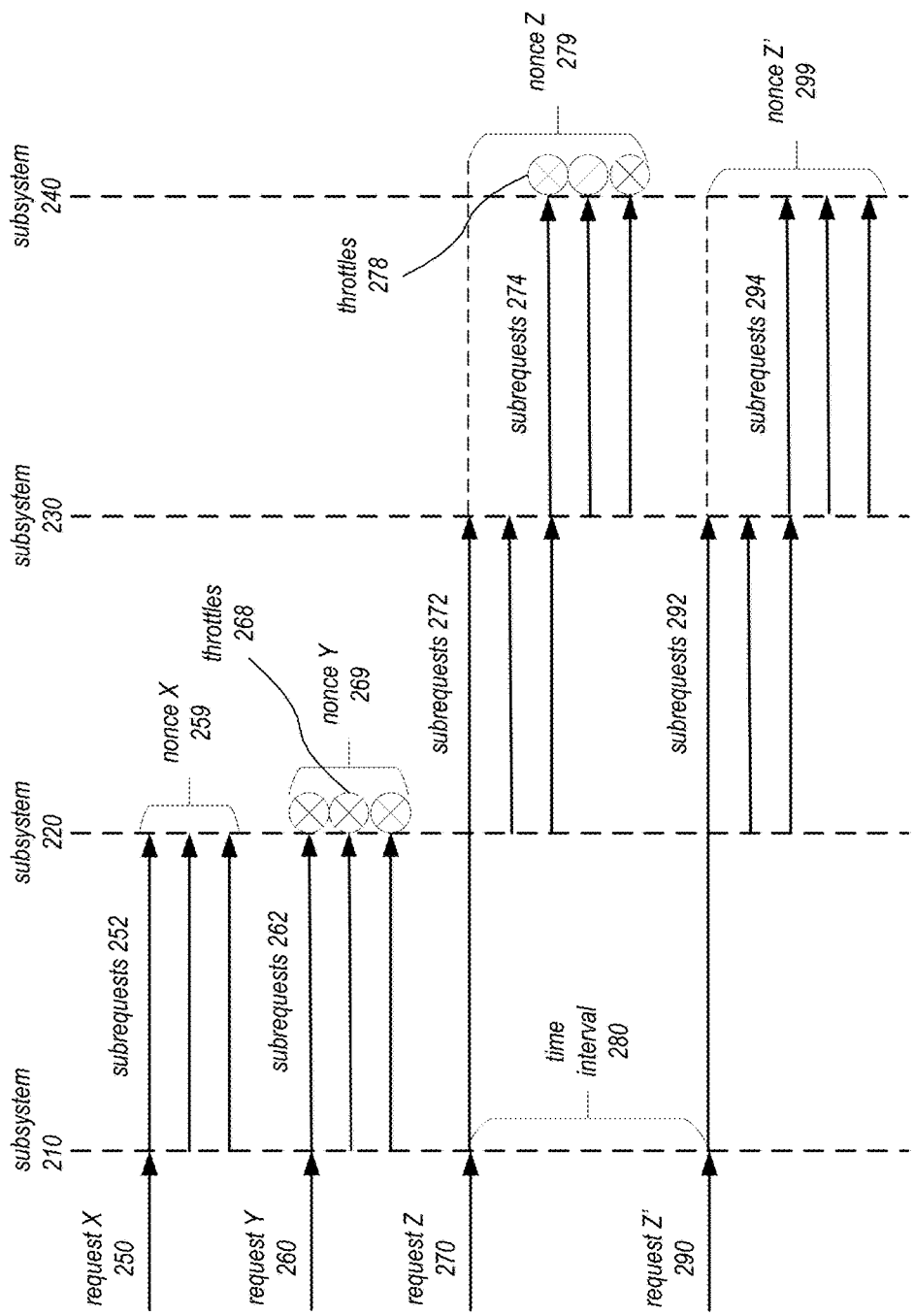
FIG. 2 is a sequence diagram illustrating the propagation of subrequests in a computer system that employs a request-specific nonce to selectively throttle subrequests, according to some embodiments.

FIG. 2 is a sequence diagram illustrating the propagation of subrequests in a computer system that employs a request-specific nonce to selectively throttle subrequests, according to some embodiments. The figure depicts the propagation of subrequests that are generated from four requests, request X 250, request Y 260, and requests Z 270 and Z' 290. Requests 250, 260, 270, and 290 may be top-level requests to a system, for example the service provider network 130 of FIG. 1. The four requests are initially received by subsystem 210, which may be a top-level subsystem that directly interfaces with clients, such as the top-level subsystem 140 discussed in connection with FIG. 1.

As depicted, request X 250 may be received first by the subsystem 210. At this point, the subsystem 210 may generate a nonce X 259, which may be shared with other subsystems in the system, including systems 220, 230, and 240. The sharing may occur in a variety of ways. In one embodiment, the nonce may simply be passed as a parameter to the subsystems via the subrequests. In another embodiment, the nonce may be consistently reproduced from parameters accessible to the other subsystems. For example, the nonce may be determined based on a set of parameters that are fixed during the life of request X. Such parameters may include, for example, a client identifier, a session identifier, a source IP address, a source TPC port address, a timestamp, etc. associated with request X 250. In some embodiments, the generated nonce may be generated by or provided to a nonce manager, which may store the nonce during the life of request X 250.

As depicted, request X 250 may cause a number of subrequests 252 to be generated to subsystem 220. In some embodiments, any failure of the subrequests 252 may cause a failure of the request X 250. In some embodiments, the nonce may be passed to subsystem 220 via an explicit input parameter to subsystem 220. In some embodiments, the nonce may be passed to subsystem 220 in another manner, for example as a header element in a web services call. When the subsystem 220 receives the subrequests 252, the subsystem 220 may regenerate or obtain the nonce X 259.

At this point, the subsystem 220 may use the nonce X 259 to determine whether subrequests 252 should be throttled. As discussed, because all subrequests are associated with the same nonce X 259, they are treated the same by the throttler for the subsystem 220. The nonce X 259 may be a pseudo-random value that is evenly distributed in a range, for example 0 to 99. The nonce thus effectively randomizes all incoming requests X, Y, Z, and Z', such that they may be randomly ranked according to a priority. In some embodiments, the nonce may be compared to a threshold to randomly throttle some set percentages of subrequests. For example, the throttler of subsystem 220 may have a threshold set at 10, such that all subrequests with nonce value below 10 are throttled. This effectively throttles incoming subrequests generated by 10% of lowest ranked top-level requests. In the illustrated example, all the subrequests 252 are serviced.

As depicted, subsystem 210 may receive a second request Y 260, and generate another nonce Y 269 for request 260. Like request X 250, request Y 260 also generates a number of subrequests 262 for subsystem 220. However, this time, the throttler for subsystem 220 may determine that the nonce Y 269 is below the throttling threshold. Accordingly, all of subrequests 262 are throttled 268 by subsystem 220. The throttling may generate a failure response code to the caller, subsystem 210. In some embodiments, the throttling by subsystem 220 may cause subsystem 210 to retry the subrequests 262. In some embodiments, retries may generate a higher ranked nonce, so that the retry attempt is less likely to get throttled. In some embodiments, subsystem 210 may simply throttle the request Y 260 in response to a throttle of one of subrequests 262.

As depicted, subsystem 210 may receive a request Z 270, and in response generate another nonce Z 279 for request 270. Request 270 may generate a number of subrequests 272 to subsystem 230, which may in turn generate a number of subrequests 274 to subsystem 240. Both subsystem 230 and 240 may obtain the nonce Z 279 to determine whether their respective subrequests should be throttled. For example, subsystem 230 and subsystem 240 may implement separate request throttlers. In this example, subsystem 230 does not throttle its subrequests 272, but subsystem 240 does throttle 278 its subrequests 274. This may be because subsystem 240 has a different throttling threshold, and it set to throttle a higher percentage of its received requests, based on its current load condition. Although subsystem 230 and subsystem 240 may make different decisions about throttling request Z 270, the nonce enables the two subsystems to coordinate, for example by the use of a shared selection technique, such that if the two subsystems do throttle, they will target the subrequests of the same lowest ranked top-level requests, according to the nonce.

As depicted, subsystem 210 may also receive a request Z' 290, after the passage of a time interval 280. Request Z' 290 may represent a retry of request Z 270, possibly from the same client. In some embodiments, the nonce generation function may take into account a quantum of time, such that as the time passes, the same request from the same client will yield different nonce values. For example, the nonce generation function may compute the nonce using the time that a request is received. The time may be quantized into a particular 5-minute interval, for example, so that each nonce is computed using a value from 1 to 12 representing a particular 5-minute interval in the hour. The nonce may then be generated using a nonce generation function that takes as one of its parameters the quantized time of the request, so that different values of the time quantization parameter will produce different values for the nonce. In this manner, retry requests that are spaced apart by a least the time interval generates a different nonce value in the system, and are thus ranked differently each time. This feature may be important in the throttling context, where the system strives to not repeatedly throttle the same requests from the same client, when offered up at sufficiently different times of day. The scheme guarantees that after the passage of the time interval 280, the request will be ranked differently, most likely taking it out of the group of lowest ranked requests exposed to throttling. In some embodiments, the system will make the time interval known to the client, by providing a message to the client after a throttle, telling the client to retry the request after the time interval. As shown in the figure, on the second try, request Z' 290 is not throttled, since is new nonce is ranked higher, allowing the subrequests 292 and 294 to avoid throttling by subsystems 230 and 240.

Figure 3:
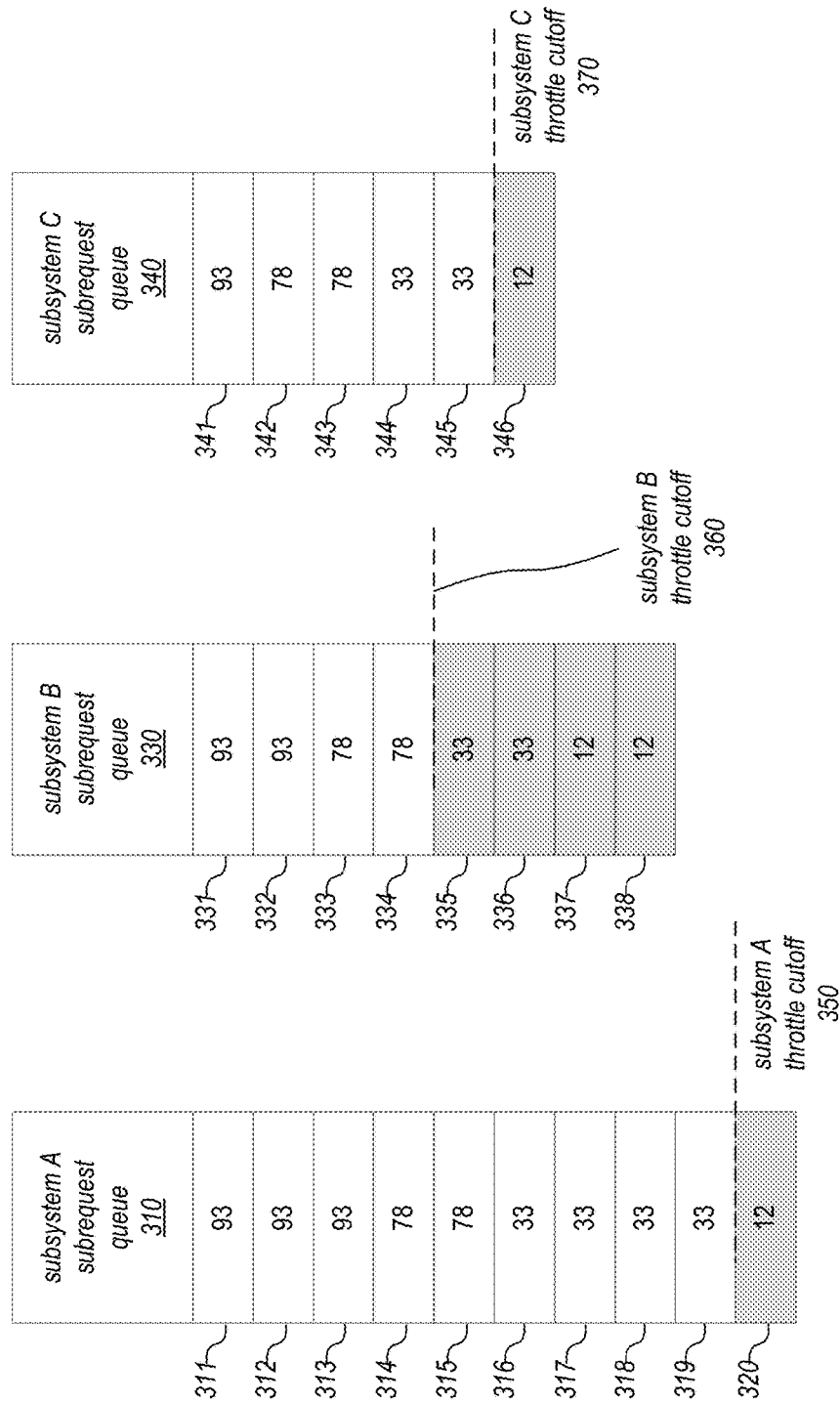
FIG. 3 illustrates exemplary subrequest queues in a computer system that employs a request-specific nonce to selectively throttle subrequests, according to some embodiments.

FIG. 3 illustrates exemplary subrequests queues in a computer system that employs a request-specific nonce to selectively throttle subrequests, according to some embodiments. In some embodiments, subsystems may implement a queue to receive incoming subrequests. In some embodiments, these queues may be maintained in a priority order, based on the nonce value of the subrequest. In this manner, the highest ranked subrequests may be serviced first. In some embodiments, the lowest ranked subrequests may be throttled. In some embodiments, the throttling may occur on any subrequest waiting in the priority queue. In some embodiments, the throttling may occur at the time subrequests are added to the priority queue. For example, the priority queue may be limited to a certain length. When a new subrequest is received, it may be placed on the queue in sorted order based on its associated nonce. However, if the priority queue is already full, some existing subrequest on the queue may be pushed off of the queue as the new subrequest is added to the queue. In some cases, the new subrequest may be the lowest ranking subrequest compared to the existing subrequests on the queue. In that case, the new subrequest will not be placed on the queue. In other words, the new subrequest will be throttled. In some embodiments, the throttling may occur at the time subrequests are removed from the queue. For example, as the subrequests are dequeued in priority or nonce order, they may be throttled based on the length of time that they have been on the priority queue. In some embodiments, the subsystems may implement at policy where older subrequests are more likely to be throttled, because these subrequests are likely to have been abandoned by the requestor or superseded by a later subrequest. Lower ranked subrequests may stay longer on the queue because they may be pushed back by higher ranked subrequests. Thus, these lower ranked subrequest may be throttled when they are finally dequeued.

As shown in the figure, three subrequest queues are shown, for subsystem A 310, subsystem B 330, and subsystem C 340. As shown, the queue 310 for subsystems A holds 10 subrequests 311-320. Each subrequest is shown by its nonce value, which in the illustrated example ranges from 0 to 99. As shown, some subrequests 311-320 have the same nonce value. This indicates that the are generate from the same top-level request. The same top-level requests have also generated subrequests to subsystems B and C, as can be seen from the queues 330 and 340 for those subsystems.

As depicted, each of the queues 310, 330, and 340 are sorted according to the nonce value of the subrequests. Thus, in some embodiments, the subsystems may process the highest ranked subrequests first, and together. Thus, for example, the three subsystems may coordinate to process all subrequests associated with top-level request (nonce value 93) first, so that that top-level request may be completed first. The three subsystems may then turn to the next top-level subrequest (nonce value 78). In this manner, certain top-level requests will be completely as quickly as possible. This is more desirable than an uncoordinated execution order by the three subsystems, which would result in the top-level requests to be completed when the last subrequest is completed.

As depicted, all three subsystems implement independent throttling based on the nonce. As shown, subsystem A implements a throttling cutoff 350 such that the subrequest(s) having a nonce value of 12 is throttled. Subsystem B implements a different throttle cutoff 360 such that subrequests having nonce values 33 and 12 are throttled. Subsystem C implements a yet different throttle cutoff 370, that throttles subrequests having nonce value 12. In some embodiments, the cutoff threshold may be a value in the nonce range, such as 20, which indicates a percentage of top-level requests to throttle, if/when necessitated by subsystems. In some embodiments, the cutoff may be specified in terms of the number of pending subrequests in the subrequest queue. For example, a subsystem may specify that after the queue reaches a size of 10, the low ranked subrequests in excess of that limit will be throttled. In some embodiments, the cutoff may be based on more complicated factors. For example, in some embodiments, the cutoff may be specified by a maximum amount of execution time allowable within a time window, and all subrequests are assigned an estimated amount of processing time. When the maximum amount of execution time is exhausted by the pending subrequests in the queue, the low ranked subrequests according to the nonce are throttled.

As can be seen from the figure, the three subsystems A, B, and C are coordinated to throttle the lowest ranked subrequests according to the nonce value by using a common selection technique. Thus, if throttling occurs at any subsystem, the throttling will be targeted towards requests with nonce value 12 first, and then 33, and so on. In this way, most of the top-level requests will be serviced with no throttling at all. This result is much better than a system where the subsystems simply throttles their subrequests randomly without coordination, since uncoordinated throttling will impact a larger number of top-level requests.

FIGS. 4A-4D are logical block diagrams illustrating different configurations that can be used to share a request-specific nonce, according to some embodiments. As discussed, after the request-specific nonce is generated for a top-level request, it may be shared among the subsystems in a variety of ways.

Figure 4A:
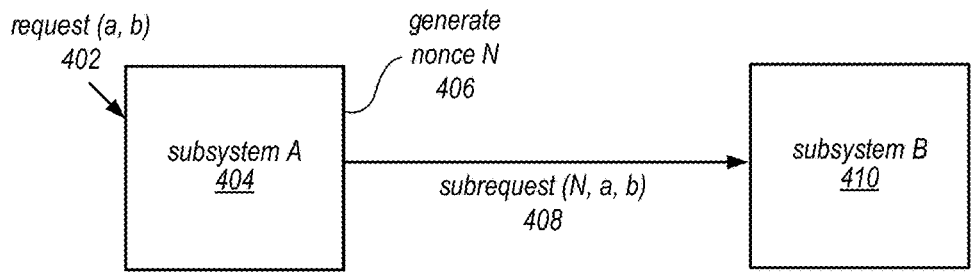
FIGS. 4A-4D are logical block diagrams illustrating different configurations that can be used to share a request-specific nonce, according to some embodiments.

In FIG. 4A, subsystem A 404 receives a request 402 with input parameters a and b. Subsystem A 404 then generates the nonce N 406, and shares the nonce N with subsystem B 410 by passing it as an input parameter in the subrequest 408 to subsystem B 410. This method is advantageous in that the nonce may be passed as call stack data, and the nonce may simply disappear when the call stack for request 402 is terminated. In some embodiments, the nonce may be passed not as an explicit parameter in a subrequest, but as a hidden parameter. For example, in some embodiments where the subrequest is a web services call (or some other web-based request), the nonce may be embedded as a parameter in the web-based call header. In some embodiments, this embedding may be performed automatically by the infrastructure of the service provider network, without any explicit function implemented by the service level code in the subsystems.

Figure 4B:
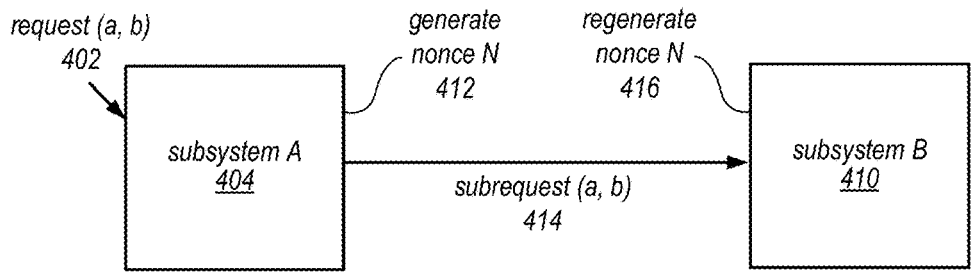

In FIG. 4B, a subsystem A 404 receives a request 402 and generate 412 the nonce, similar to FIG. 4A. In this case, subsystem A 404 may send a subrequest 414 to subsystem B 410 without including the nonce in the subrequest 414. In turn, subrequest B 410 may regenerate 416 the nonce. In some embodiments, the subsystem A 404 may not require the nonce, and thus may not generate the nonce at all. In some embodiments, the regeneration of the nonce by subsystem B may use the same nonce generation function as used in the generation of the nonce by subsystem A 404. In some embodiments, the parameters used to generate the nonce may be the same for subsystems A and B. For example, the parameters used to generate the nonce may be unique to the request 402, and invariant for all subrequests that result from the request 402.

In some embodiments, the parameters used to generate the nonce may include a client identifier for the request 402, and a timestamp associated with the request 402. This combination of parameters may be sufficient to uniquely identify the request 402. In some embodiments, the parameters may be passed to subsystem B 410. For example, in the figure, the nonce N may be generated based on parameters a and b. Thus, subsystem B 410 is able to reproduce the nonce using the input parameters to subrequest 414. In some embodiments, the nonce parameters may be otherwise accessible to subsystem B 410. For example, the subsystems A and B may share some context data, for example a session data object. This session data object may be accessible by both subsystems A and B without having to be passed around, and this session data object may include the parameters used to compute the nonce.

Figure 4C:
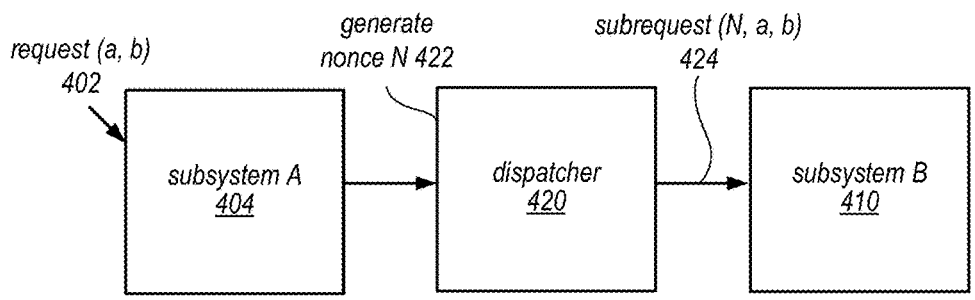

In FIG. 4C, a subsystem A 404 receives a request 402, similar to FIGS. 4A-B. In this case, a subrequest 424 that results from the request 402 may be communicated to subsystem B 410 via a dispatcher 420, and the dispatcher 420 may generate 422 the nonce. For example, in some embodiments, subsystem B 410 may implement a web service. Thus, web services requests directed to subsystem B 410 may be first received by a web server, which may parse the web service request or perform some initial processing. In these embodiments, the web server for subsystem B 410 may generate 422 the nonce for subsystem B 410. In some embodiments, calls from subsystem A to subsystem B may be in the form of messages, which may be added to a queue. That is, subsystem A may enqueue a subrequest to the queue, and subsystem B may dequeue the subrequest. In such embodiments, the queue manager may generate the nonce for subsystem B, possibly based on the input parameters of the enqueued subrequest. In some embodiments, a system may implement a load balancer which distributes subrequests to a pool of instances in subsystem B. In such embodiments, the load balancer may be the dispatcher 420, and generate the nonce before selecting an instance in subsystem B to handle the subrequest 424.

Figure 4D:
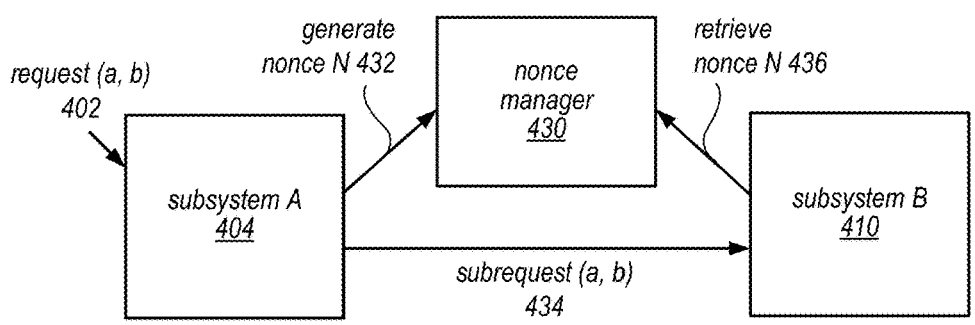

In FIG. 4D, a subsystem A 404 receives a request 402, similar to FIGS. 4A-C. In this case, the subsystem A 404 may generate a nonce and send it to a nonce manager 430 for storage. In some embodiments, the subsystem A 404 may not generate the nonce, but simply instruct the nonce manager to generate the nonce, by for example providing the parameters needed to generate the nonce. The subrequest 434 is sent to subsystem B 410 without the nonce. However, in some embodiments, the subsystem B 410 may retrieve 436 the nonce from the nonce manager 430. For example, the subsystem B 410 may provide the nonce manager the parameters that are needed to identify the nonce in the nonce manager 430. In some embodiments, the nonce manager may maintain the nonce in a lookup table that is keyed based on the parameters used to generate the nonce. The nonce manager 430 may be advantageous in some situations by providing a common point of configuration for nonce generation and management.

A person of ordinary skill would understand that there are a variety of ways to share the nonce within a service provider system, and that the approaches depicted in FIGS. 4A-D are merely exemplary. Depending on the implementation, different ways of sharing may be employed in different embodiments. In some embodiments, a combination of the approaches described above may be employed to share the nonce.

Figure 5:
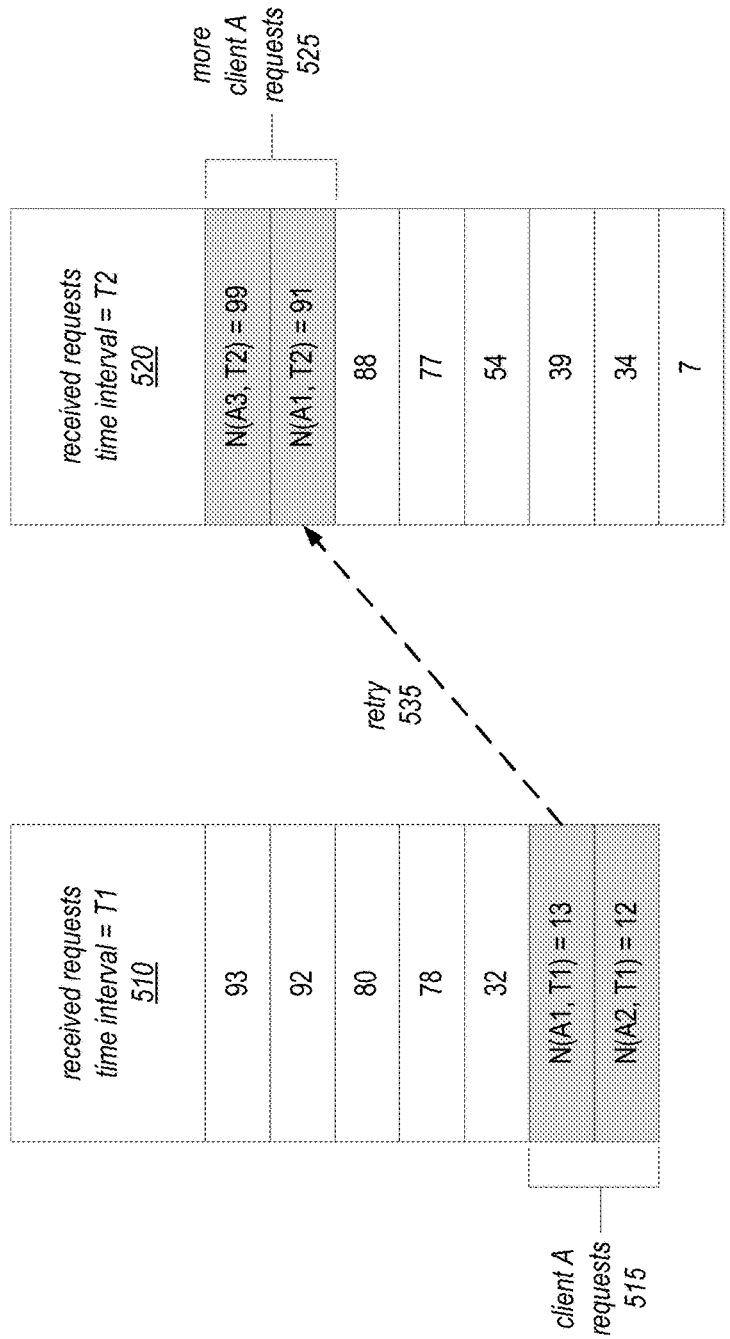
FIG. 5 illustrates an exemplary ranking of requests in a computer system that employs a request-specific nonce to selectively throttle subrequests, according to some embodiments.

FIG. 5 illustrates an exemplary ranking of requests in a computer system that employs a request-specific nonce to selectively throttle subrequests, according to some embodiments. As shown, ranking 510 represents a ranking of requests received by a service provider. The numbers in the ranking 510 indicates, for example, nonce values generated for a number of top-level requests. The list may represent requests that are currently live in the service provider network. Such a list may be maintained for example by a nonce manager, as discussed previously.

As shown, ranking 510 and ranking 520 may represent two views of the request rankings at two different points in time. For example, as requests are received and serviced by the service provider network, the requests in the system may be changing constantly, and the rankings may be changing constantly. In some embodiments, the service provider network may be configured to periodically change the ranking function by taking into account the time of an incoming request in the computation of the nonce. Thus, repeated requests from the same client will likely generate a different nonce at sufficiently different times.

For example, in some embodiments, the service provider network may divide the time into 5-minute intervals. Each interval may be associated with a different value (e.g., 1 to 12 in an hour) that is used as an input parameter to the nonce generation function. Thus, the nonce generation function will likely generate different nonce values, even for repeat requests from the same client, when the requests are received in different time intervals. In some embodiments, this approach may ensure that distinct requests from a particular client do not get repeatedly throttled, due to some invariant characteristic in the client's requests.

For example, as shown, client A may submit requests 515 to the service provider system, which is reflected in the gray entries in the rankings 510 at a first time interval. The requests may generate nonce values 13 and 12, which places them on the bottom of the rankings 510. This means that these requests from client A may likely be throttled, if the service provider system is in a throttling state. If so, the client A may receive no response or a failure response from the service provider system, and client A may retry 535 some of its requests.

In some embodiments where the service provider system does not use a time-varying nonce generation function, the nonce generation function may produce a new nonce for the retry requests of client A that is also ranked low. This may occur if there is some invariant property in the requests from client A that causes the nonce generation function to always generate low ranking nonces. To avoid this problem, in some embodiments, the service provider system may inject a time variable, such as for example a time interval indicator T1 or T2, into the nonce generation process. By using the time variable, the nonce generation process for client request A may change from interval T1 to interval T2, thus ensuring that the requests from client A will not always generate low ranking nonces.

For example, as shown, in time interval T2, the generate nonce values 525 for client A requests may be highly ranked. This means that these requests will not likely be throttled by the system. One of the two requests 525 may be a retry of a previous request 515 by client A, allowing client A to be service in one of two tries. In some embodiments, the time interval that is used in the nonce generation process may be provided to the client, so that the client may time its retry attempts accordingly. For example, in some embodiments, in a throttle message to the client, the service provider network may indicate that the client should retry the request after passage of the time interval, for example 5 minutes, at which point the nonce value generated for the retry request will be different. Such a message may discourage the client from aggressively retry the request at a high frequency, which may aggravate the load of the service provider system, causing it to throttle even more requests.

In some embodiments, the service provider system may implement its nonce generation function to promote randomness and/or fairness to clients and/or types of requests. For example, in some embodiments, the nonce generation function may "flip" the nonces in consecutive time intervals, so that the function may generate nonce X in a first time interval T1, and nonce 100–X in the next time interval T2. This way, certain types of consistently low-ranking clients or requests may be ranked highly at every other interval. In some embodiments, the nonce generation function may apply a multiplier to the nonce values and generate a modulo of the result over the range. Such techniques may be used to make sure that no type of requests are consistently being treated unfairly by the nonce generator. In some embodiments, the nonce generation function may apply a hashing function, such as a cryptographic hash function, to combine a quantized time, such as the time rounded to the nearest 5-minute mark, with other aforementioned elements in a nonce, such as the client ID, providing a more final nonce, that is pseudo-randomly fair over time to a client.

Figure 6:
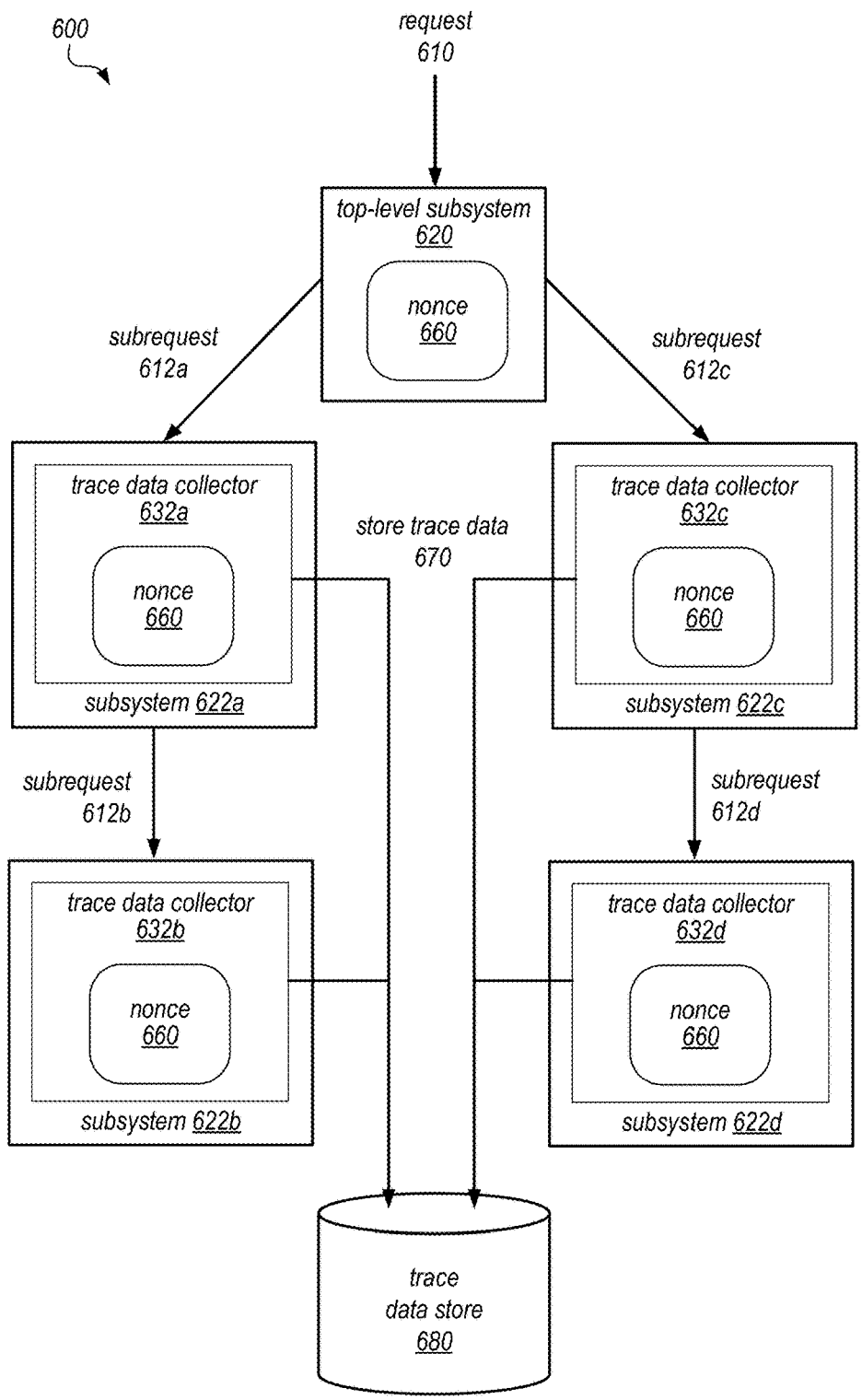
FIG. 6 is a block diagram illustrating an example computer system that employs a request-specific nonce to selectively collect trace data, according to some embodiments.

FIG. 6 is a block diagram illustrating an example computer system that employs a request-specific nonce to selectively collect trace data, according to some embodiments. A system 600 may be configured to trace operational data or metrics generated during the system operation. In some embodiments, each of the subsystems 620 and 632a-d may be configured with one or more components for monitoring interactions between or within the subsystems. These interaction monitors may monitor or track interactions between or within the subsystems or with external systems. The monitored interactions may include service requests (such as subrequests 612a-d), responses to requests, and/or other suitable events.

In some embodiments, the interaction monitors may monitor requests in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

In some embodiments, to monitor the requests within the system, lightweight instrumentation may be added to subsystems, including subsystems 622a-d. The instrumentation (e.g., a reporting agent associated with each subsystem) may collect and report data associated with each inbound request, outbound request, or other service interaction (e.g., a timer-based interaction) processed by a subsystem.

Based on the interaction monitoring, a subsystem 622 may collect trace data using a trace data collector 632a-d, and send the trace data to a trace data store 680. For example, subsystem 622a may employ a trace data collector 632a. The trace data may describe aspects of subrequest interactions. In one embodiment, the trace data may be generated in real-time or near real-time, e.g., as subrequests and responses are received and/or processed by the subsystems. The trace data may include data indicative of relationships between individual subsystems or subsystem components, such as an identification of the calling (i.e., requesting) component and the called (i.e., requested) component for each interaction. The trace data may include metadata such as request identifiers that are usable to identify paths of subrequests and responses from subsystem to subsystem. The trace data may also include data describing the performance of the subrequest interactions. For example, the trace data may include data indicative of network latency for a subrequest or response, data indicative of network throughput for one or more interactions, data indicative of a subsystem's reliability or availability, data indicative of resource usage, etc. The trace data generated for multiple subsystems and subrequest interactions may be sent to the trace data store 680 for aggregation and analysis. In some embodiments, call graphs for the system may be generated based on the trace data.

In some embodiments, the trace data collectors 632a-d may each implement its own trace data collection policy, where only a certain proportion of subrequests handled by the subsystem are traced. The tracing may be limited to only a percentage of actual subrequests for a number of reasons. In some embodiments, the tracing may be performed on a production system, and excessive tracing may hinder system performance. In some embodiments, the tracing may generate an excessive volume of trace data that is unnecessary for performance monitoring purposes, etc. Thus, in some embodiments, the trace data collectors 632 may randomly trace a different percentage of subrequests, e.g., 10%, 15%, etc., according to its own data collection policy.

In some embodiments, the data collection may specify a proportion of subrequests to trace, for example, only the top 10% of the subrequests. In some embodiments, the policy may maintain a cutoff for tracing subrequests based on an absolute number of subrequests. For example, a subsystem 622*a* and/or trace data collector 632*a* may be configured to only trace 200 subrequests during a 24-hour period. In some embodiments, the tracing policy may be determined based on other factors, such as a type of subrequest, or an amount of trace data that the subrequest is expected to generated.

In some embodiments, the system 600 may share among its subsystems a nonce value 660. The nonce 660 may be similar to the nonce 160 discussed in connection with the throttling system of FIG. 1. For example, the nonce 660 may be consistently obtained by all subsystems for all subrequests 612 stemming from a top-level request 610. For example, in some embodiments, the nonce may be obtained via a nonce determination technique that provides a consistent pseudorandom nonce value for subrequests stemming from a same top-level request. The nonce determination technique may be used by all subsystems, and allow the nonce 660 to be obtained by a variety of methods, depending on the embodiment. For example, in some embodiments, the nonce 660 may be passed from subsystem to subsystem as an explicit parameter in the subrequests 612. In some embodiments, the nonce 660 may be included in the web service call as part of the web service call header. In some embodiments, the nonce 660 may be generated in one subsystem using a known and consistent nonce generation function and a set of parameters that is invariant for all subrequests stemming from a top-level request, and then regenerated at a different subsystem using the same nonce generation function and the same set of parameters. In some embodiments, the system 600 may implement nonce manager that maintains the nonce. The nonce manager may be implemented as a separate module, or as a part of each subsystem 622, or some subset of the subsystems 622. In some embodiments, the nonce manager may be implemented as part of the top-level subsystem 620. In some embodiments, the nonce manager may be implemented as part of a dispatcher or load balancer of the system 600, and generate a nonce when as the request is dispatched or forwarded to the rest of the subsystems.

In some embodiments, the top-level subsystem 620 may generate a nonce for a received request 610. The generated nonce 660 may be a value that is generated based on one or more parameters associated with the request 610. In some embodiments, the nonce may uniquely identify all requests 610 received by the system 600, within a period of time. In some embodiments, the nonce may be generated as a pseudorandom value within a range. For example, the nonce may be an integer from 0 to 99 that is randomly distributed in the range based on the input parameters. In some embodiments, the nonce may be computed from request parameters such as a client identifier, a session identifier, a source IP address, or a source TCP port number. In some embodiments, the nonce may be based on the type of request 610 that is received. In some embodiments, the nonce may be based on parameters that are not explicitly provided in the request 610. For example, the nonce may be based on a request identifier or transaction identifier generated for the request 610 by the system 300. In some cases, the request or transaction identifier may be generated by a counter.

In some embodiments, the nonce may be based on a timestamp associated with the request 610, for example, the time that the request is received. The timestamp may be quantized in some embodiments, for example, based on discrete time intervals of 5 minutes. Thus, every request may be designated one of twelve 5-minute intervals during the hour. A nonce generation function may be applied to the time quantization as a parameter, so that the function will generate a different nonce value for different values of the time quantization parameter. In some embodiments, the nonce may be generated using a hash function that hashes one or more of the above parameters into a value within the range.

In some embodiments, the top-level subsystem 620 may generate the nonce 660, while in other embodiments, the subsystems may be able to generate the nonce independently based on a known and consistent generation function and known parameters. Thus, in some embodiments, the top-level subsystem 140 may not generate the nonce 160. In some embodiments, a separate nonce manager may be responsible for generating the nonce. In some embodiments, the nonce may be generated by another module or subsystem in the system 600, and the nonce manager may only be responsible for maintaining and distributing the nonce, during the pendency of the request 610. In some embodiments, after the request 610 is serviced by the system (or failed), the top-level subsystem 620 may instruct the nonce manager to expire the nonce, as the request 610 is no longer live in the system. In some embodiments, the nonce manager may purge its nonce values periodically, after some specified period of time. For example, the nonce manager may assume that after 24 hours, a request nonce may be deleted.

In some embodiments, the nonce 660 may be unique to the top-level request 610. Thus, the nonce is a consistent value that may be reproduced by all subsystems in the system 600 that handle subrequests generated from the top-level request 610, using the same set of parameters associated with the top-level request 610. However, in some embodiments, subsystems of the system 600 may generate additional nonces that are designed to track other requests in the system. For example, in some embodiments, nonces may be generated for any subrequest in the system 600, so that downstream subsystems from the subrequest may make coordinated decisions based on the subrequest nonce. In some embodiments, a nonce may be generated to track a client session that may span multiple client requests.

In some embodiments, the nonce 660 is generated in a pseudorandom fashion, so that it is evenly distributed in a normalized range. This randomization allows the nonce to be used by other subsystems to perform a randomized selection of subrequests based on the top-level request 610. However, in some embodiments, the nonce may be generated such that it is not evenly distributed in the range. Thus, the nonce generator may influence the selection decisions of the later subsystems. For example, nonce generator may restrict the nonce for some requests to a value from 0 to 19, out of a full range of 99. This means that the nonce for these requests will always be ranked in the top 10%, which makes subrequests associated with the nonce more likely to be traced.

Similar to nonce 160 as discussed in connection with FIG. 1, the nonce 660 may be shared or obtained by the subsystems in a variety of ways. In some embodiments, the nonce 660 may be provided to the subsystems 622 by passing the nonce with the subrequests 612. The nonce may be attached to all subrequests that are generated in the service provider network as a result of the request 610. In some embodiments, the nonce may be regenerated by the subsystems 612 using the same nonce generation function that originally produced the nonce. In some embodiments, a nonce manager may receive the nonce when it is first generated, and provide the nonce to the trace data collectors 632 of the subsystems. In some embodiments, the nonce may be provided upon a request from each subsystem, as it is required. In some embodiments, the nonce may be pushed to the subsystems, immediately after the nonce is generated. In some embodiments, subrequests may be made using a messaging protocol where messages are placed on a queue. In such systems, the nonce may be stored in each message that is placed on the queue.

In some embodiments, the trace data collectors 632 may use the nonce to determine whether to trace the subrequests that they receive. Although each trace data collector may each implement its own tracing policy, the nonce generated for the top-level request 610 ensures that each trace data collector shares a common priority ranking of top-level requests. Because all subrequests from a single top-level request are associated with the same nonce value, they may be ranked the same by all of the subsystems. For example, the trace data collectors 632 may use the nonce to coordinate the throttling decision by agreeing that all high ranking nonce values (top 10%, top 20%, etc.) should be traced. This means that most of the tracing in the system will be focused on the high-ranking top-level requests 610, and that other top-level requests 610 will not experience any tracing of their subrequests. The subrequests of the same top-level request will be treated consistently by all of the trace data collectors 632a-d. As may be understood, use of the nonce as described provides a means of coordination among the subsystems, such that the randomized tracing of subrequests are focused on a small number of top-level requests. In some embodiments, the collection of trace data by the different trace data collectors may be coordinated such that the tracing process results a proportion of top-level requests with complete traces, i.e., traces that include trace data for all subrequests stemming from the top-level request. In some embodiments, the coordination may be implemented such that the proportion of top-level requests having complete traces is no less than any of the trace collection levels at each of the subsystems. Such coordination allows more top-level requests to be fully traced while at the same time meeting the tracing limits of each subsystem.

In some embodiments, subrequest selection functionality may be implemented as part of trace instrumentation within the subsystems 622. In some embodiments, the trace instrumentation may include a reporting agent that collects and compiles trace data from the modules of the subsystems, and the selection functionality may be implemented in such a reporting agent. In some embodiments, the selection module(s) may obtain a nonce associated with the subrequest, and use a common selection technique to determine whether to trace subrequests (e.g., compare the nonce against a cutoff or threshold specified as part of the tracing policy of the subsystem). In some embodiments, if the nonce is higher than the cutoff or threshold, the subrequest and all other subrequests sharing the nonce will be traced In some embodiments, multiple subsystems 622a-d will share the nonce. That is, all subsystems will rank the subrequests associated with the same nonce the same way. Thus, the subsystem may use the common selection technique to focus on the same top-level requests to trace. This coordination ensure that complete traces will be collected for the top-level requests, even though the selection process at the subsystem level is random. This is more desirable than an uncoordinated tracing of subrequests by the different subsystems, which would result in largely incomplete traces of the top-level requests.

In some embodiments, the tracing policies of the system may be configurable via a user interface. The user interface may allow a user to specify the percentages of subrequests to trace at each subsystem, or specify constraints (e.g. space limits) on the tracing. In some embodiments, the user interface may display a call graph showing the subsystems 622a-d as the nodes on the graph, and call statistics for subrequests 612a-d on the edges of the call graph. In some embodiments, the user may select an element on such a call graph to see performance statistics on each subsystem. In some embodiments, the user may select an element to configure the trace data collection parameters of the element. For example, in some embodiments of such a user interface, the user may specify how subrequests are prioritized for tracing, which may dictate how a nonce is generated.

Figure 7:
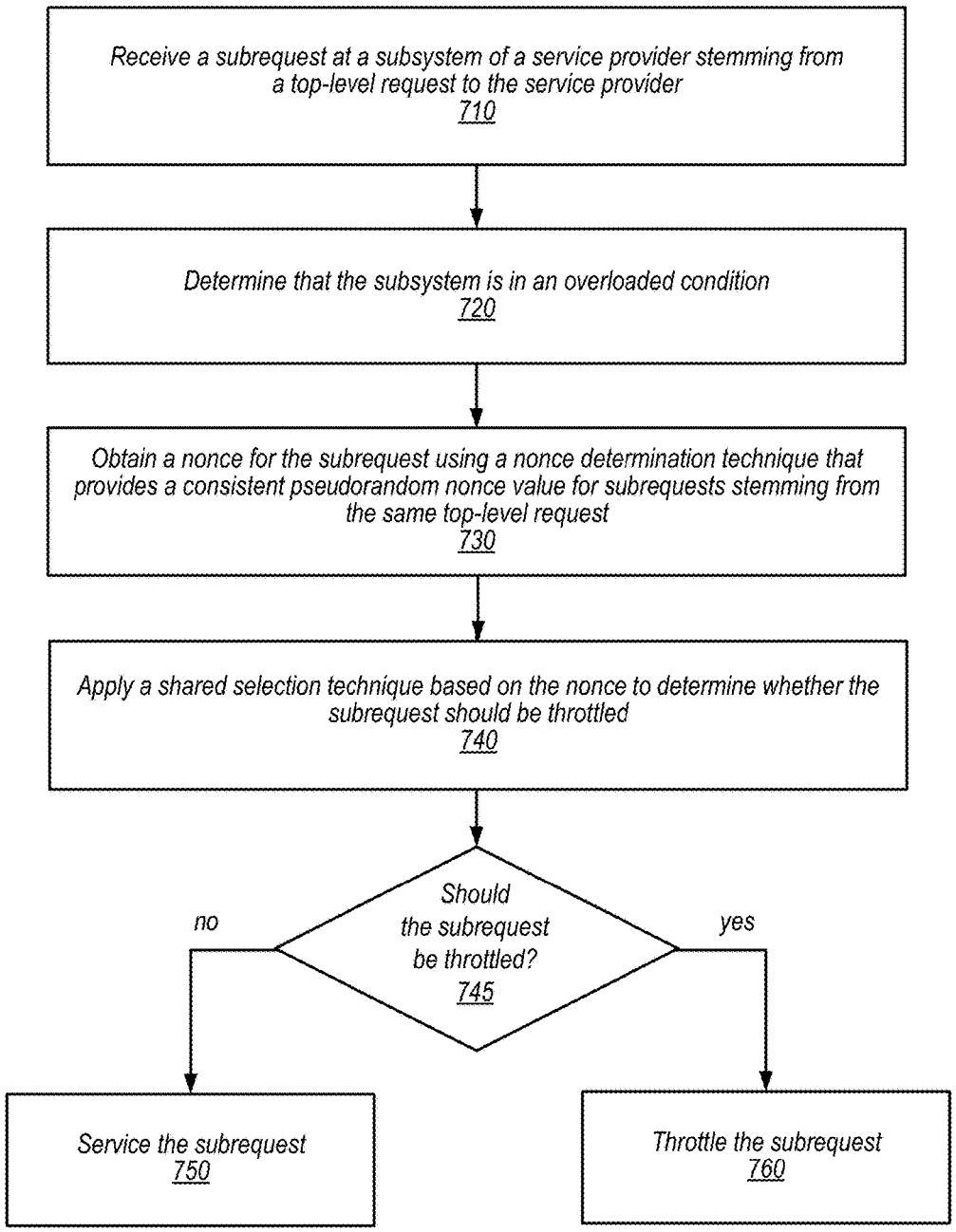
FIG. 7 is a flowchart illustrating exemplary operations of a computer system that employs a request-specific nonce to selectively throttle subrequests, according to some embodiments.

FIG. 7 is a flowchart illustrating exemplary operations of a computer system that employs a request-specific nonce to selectively throttle subrequests, according to some embodiments. At operation 710, a subrequest is received at a subsystem of a service provider, stemming from a top-level request to the service provider. For example, the top-level request may be request 150 shown in FIG. 1, and the subrequest may be subrequest 152a received by subsystem 142a shown in FIG. 1. In some embodiments, the subrequest may be retrieved from a request queue of the subsystem that is used to buffer incoming subrequests. In some embodiments, the throttling may occur as subrequest are dequeued from the request queue. In some embodiments, the throttling may occur on pending subrequests in the queue.

At operation 720, a determination is made that the subsystem is in an overloaded condition. For example, some subsystems may implement a throttling module, such as throttling module 162a. The throttling module may monitor the state of request queues for the subsystem to determine if the current number of pending requests to the subsystem exceeds a critical number, and whether some requests need to be throttled. Each subsystem in the service provider network may implement its own throttling policy, depending on the capabilities of the subsystem. If the subsystem is in an overloaded state, the subsystem may proceed to operation 730 to initiate a random throttling of subrequests.

At operation 730, a nonce is obtained. The nonce may be for example nonce 160 discussed in connection with FIG. 1. The nonce may be obtained based on a nonce determination technique that produces a consistent pseudorandom nonce value for all subrequests stemming from the same top-level request. The nonce may be generated based on one or more parameters associated with the request, or based on a server generated value for the request. In some embodiments, the nonce may be generated by the subsystem itself. In some embodiments, the generation may be performed by another subsystem, such as a dispatcher, a load balancer, or a nonce manager. In some embodiments, the nonce may be a value that is randomly and evenly distributed in the range (for example from 0 to 99). In some embodiments, the nonce may be computed from request parameters such as a client identifier, a session identifier, a source IP address, or a source TCP port number. In some embodiments, the nonce may be generated based on a timestamp associated with the request, for example, the time that the request is received. The timestamp may be quantized in some embodiments, for example, based on discrete time intervals of 5 minutes. The timestamp may be used as a parameter to a nonce generation function that produces different values for the nonce based on different values of the time quantization. In some embodiments, the nonce value may be passed to the subsystem as part of the subrequest. In some embodiments, the subsystem may independently generate the nonce based on a known and consistent nonce generation function and a set of parameters that are invariant for all subrequests of a given top-level request. These parameters may be passed in to the subsystem with the subrequest, or generally accessible to the subsystem as context data or via another shared subsystem.

At operation 740, a shared selection technique based at least in part on the nonce value is applied to determine whether the subrequest should be throttled. The selection technique may be shared by all subsystems in the system that throttles subrequests, so that coordination may be performed to throttle the subrequests of a minimal set of top-level requests. The selection technique may be applied to the nonce and a subsystem-specific selection parameter. For example, in some embodiments, the selection technique may involve comparing the nonce value to a subsystem-specific throttling threshold, and those subrequests having nonces above or below the threshold will be selected for throttling. In some embodiments, the threshold may be a cutoff threshold for throttling, which may be a value in the nonce range (e.g., 0 to 99). For example, the cutoff threshold may be 10, so that subrequests having a nonce value of 0 to 9 will be throttled, and subrequests having a nonce value of 10 to 99 will not be throttled.

In some embodiments, the subsystems may implement a priority queue for holding received subrequests. In some embodiments, these priority queues may be maintained in a sorted order, based on the nonce value of the subrequests. In this manner, the highest ranked subrequests may be serviced first. In some embodiments, the lowest ranked subrequests may be throttled. The throttling may occur at the time subrequests are added to the priority queue. For example, the priority queue may be limited to a certain length. When a new subrequest is received, if the priority queue is already full, a determination is made to throttle the lowest ranking subrequest among the existing subrequests on the queue and the new subrequest. If the lowest ranking subrequest is an existing subrequest on the queue, it may be pushed off of the queue as the new subrequest is added to the queue. If the new subrequest is the lowest ranking subrequest, the new subrequest will not be placed on the queue. In other words, the new subrequest will be throttled. In some embodiments, the throttling may occur at the time subrequests are removed from the queue. For example, as the subrequests are dequeued in priority or nonce order, they may be throttled based on the length of time that they have been on the priority queue. In some embodiments, the subsystems may implement at policy where older subrequests are more likely to be throttled, because these subrequests are likely to have been abandoned by the requestor or superseded by a later subrequest. Lower ranked subrequests may stay longer on the queue because they may be pushed back by higher ranked subrequests. Thus, these lower ranked subrequest may be throttled when they are finally dequeued.

In some embodiments, the subsystems of the service provider may coordinate throttling decisions based on the nonce determination technique and the selection technique. For example, each subsystem may select subrequests to throttle based on the same nonce determination technique, so that all subrequests stemming from the same top-level requests are treated the same. Each subsystem may also employ the same selection technique, for example, by comparing the subrequest nonce to some subsystem-specific threshold. For example, the subsystems may coordinate to throttle the subrequests with the lowest nonce values. For example, subsystem A may throttle all subrequests having nonce values less than 20, and subsystem B may throttle all subrequests having nonce values less than 30. Because the nonce value is the same for all subrequests stemming from a single top-level request, such a throttling scheme ensures that the throttling of all subsystems is limited to a proportion of top-level requests that is no larger than the throttling level at each of the subsystems. In the example with subsystems A and B, only top-level requests with nonce values less than 30 will experience throttling of subrequests.

Operation 745 is a decision branch point. If it is determined that the subrequest should not be throttled, the process proceeds to operation 750, where the subrequest is serviced normally. However, if it is determined that the subrequest should be throttled, the process proceeds to operation 760, where the subrequest is throttled. The throttling operation may be implemented in a variety of ways, depending on the implementation of the system. In some embodiments, the subrequest may just be ignored. In some embodiments, the subrequest may return with a return or status code indicating that the subrequest failed due to a throttling condition. In some embodiments, a message may be provided to a client associated with the request, indicating to retry the request after passage of a time interval. In some embodiments, the nonce value may be computed based on this time interval. The time interval may be a discrete interval (e.g., 5 minutes) during which the request was first received by the first subsystem. Because the nonce is computed using the time interval, it is likely to generate different values for the same type of requests for the same clients from one interval to the next, ensuring a fair treatment of all client requests over time. In such cases, the message may be provided to the client to retry the request after the passage of this time period, when the request will generate a new nonce based on the new time period. The message may discourage the client from repeatedly retrying the request in rapid succession, which tends to aggravate the congestion of an already overloaded system.

Figure 8:
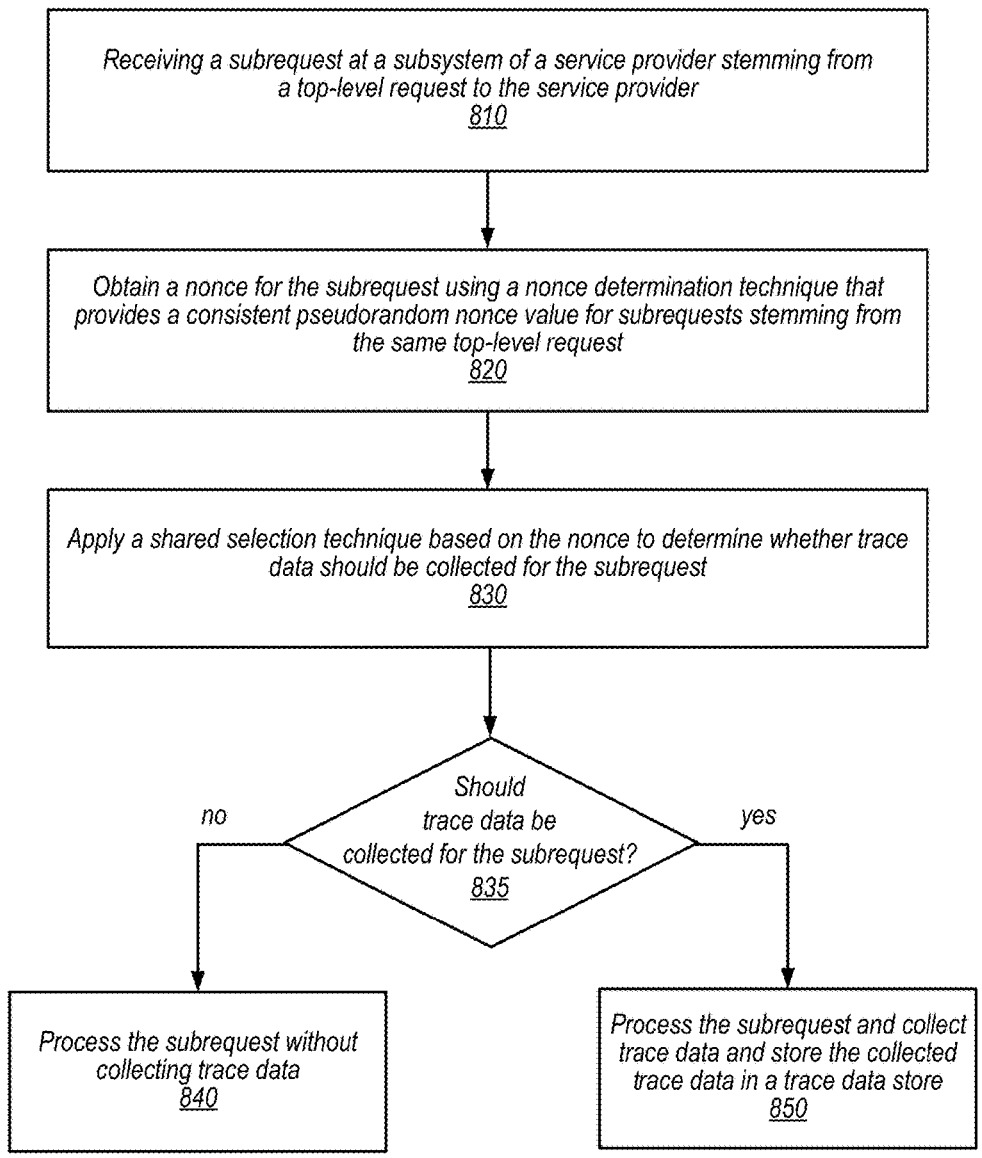
FIG. 8 is a flowchart illustrating exemplary operations of a computer system that employs a request-specific nonce to selectively collect trace data, according to some embodiments.

FIG. 8 is a flowchart illustrating exemplary operations of a computer system that employs a request-specific nonce to selectively collect trace data, according to some embodiments. At operation 810, a request is received a subrequest is received at a subsystem of a service provider. The subrequest may stem from a top-level request to the service provider. For example, the top-level request may be request 610 shown in FIG. 6, and the subrequest may be subrequest 612b received by subsystem 622b shown in FIG. 6.

At operation 820, a nonce is obtained. The nonce may be for example nonce 660 discussed in connection with FIG. 6. The nonce may be obtained based on a nonce determination technique that produces a consistent pseudorandom nonce value for all subrequests stemming from the same top-level request. The nonce may be generated based on one or more parameters associated with the request, or based on a server generated value for the request. In some embodiments, the nonce may be generated by the subsystem itself. In some embodiments, the generation may be performed by another subsystem, such as a dispatcher, a load balancer, or a nonce manager. In some embodiments, the nonce may be a value that is randomly and evenly distributed in the range (for example from 0 to 99). In some embodiments, the nonce may be computed from request parameters such as a client identifier, a session identifier, a source IP address, or a source TCP port number. In some embodiments, the nonce may be generated based on a timestamp associated with the request, for example, the time that the request is received. The timestamp may be quantized in some embodiments, for example, based on discrete time intervals of 5 minutes. In some embodiments, the nonce value may be passed to the subsystem as part of the subrequest. In some embodiments, the subsystem may independently generate the nonce based on a known and consistent nonce generation function and a set of parameters that are invariant for all subrequests of a given top-level request. These parameters may be passed in to the subsystem with the subrequest, or generally accessible to the subsystem as context data or via another shared subsystem.

At operation 830, a shared selection technique based at least in part on the nonce value is applied to determine whether trace data should be collected for the subrequest. The selection technique may be shared by all subsystems in the system that collects trace data for subrequests, so that coordination may be performed to collect complete traces for a maximum set of top-level requests. The selection technique may be applied to the nonce and a subsystem-specific selection parameter. For example, in some embodiments, the selection technique may involve comparing the nonce value to a subsystem-specific trace sampling threshold, and those subrequests having nonces above or below the threshold will be selected for tracing. In some embodiments, the threshold may be a cutoff threshold for collecting sample data, which may be a value in the nonce range (e.g., 0 to 99). For example, the cutoff threshold may be 90, so that trace data for subrequests having a nonce value of 91 to 100 will be collected, and subrequests having a nonce value of 0 to 90 will not have their trace data collected.

In some embodiments, the subsystems of the service provider may coordinate trace data collection decisions based on the nonce determination technique and the selection technique. For example, each subsystem may select subrequests to trace based on the same nonce determination technique, so that all subrequests stemming from the same top-level requests are ranked treated the same. Each subsystem may also employ the same selection technique, for example, by comparing the subrequest nonce to some subsystem-specific threshold. For example, the subsystems may coordinate to trace the subrequests with the highest nonce values. For example, subsystem A may trace all subrequests having nonce values greater than 80, and subsystem B may trace all subrequests having nonce values greater than 90. Because the nonce value is the same for all subrequests stemming from a single top-level request, such a tracing scheme ensures that the trace collection of all subsystems is focused on a proportion of top-level requests, the proportion being no smaller than the tracing level at each of the subsystems. In the example with subsystems A and B, all top-level requests with nonce values greater than 90 will have subrequest traced, so that these top-level requests will generate complete traces including traces for all subrequests.

At operation 835, a determination is made by the subsystem whether trace data should be collected for the subrequest. If not, at operation 840, the subrequest is processed without collected the trace data. If yes, at operation 850, the subsystem processes the subrequest while capturing the trace data. As discussed, this may be accomplished using instrumentation included in the subsystem for such purposes. For example, in some embodiments, the subsystem itself may be programmed to report runtime data to a reporting agent, which then formats and processes the data into trace data. Trace data is then stored in a trace data store (e.g., trace data store 680), which may be used for later analysis of the system.

Figure 9:
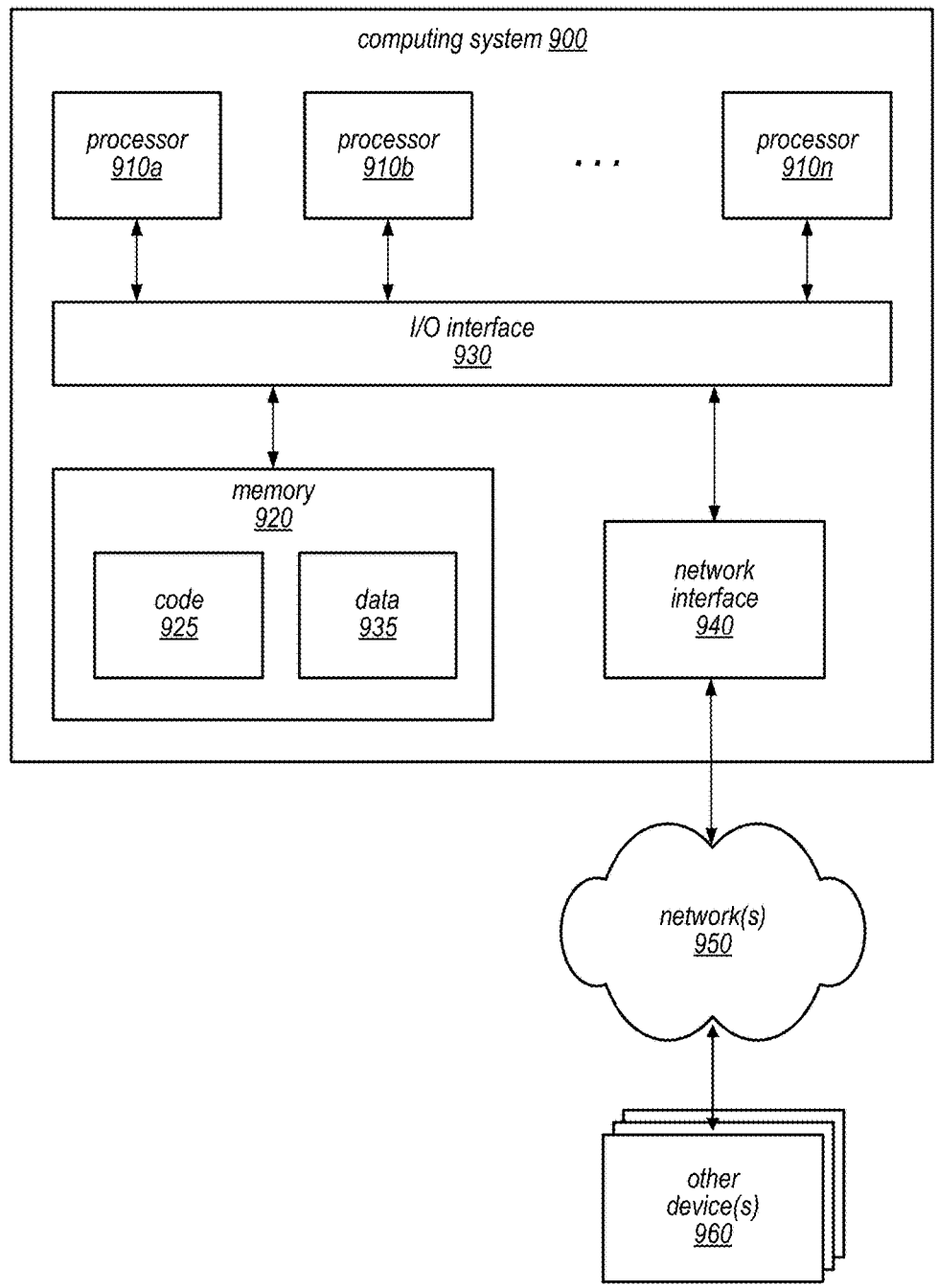
FIG. 9 is a block diagram illustrating an example computer system that can be used to implement one or more portions of a computer system that employs a request-specific nonce, according to some embodiments.

FIG. 9 is a block diagram illustrating an example computer system that can be used to implement one or more portions of a computer system that employs a request-specific nonce, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a top-level subsystem, implemented by one or more processors with associated memory, configured to receive a plurality of top-level requests;
    a first subsystem, implemented by one or more processors with associated memory, configured to:
        receive a first subrequest stemming from a top-level request of the plurality of top-level requests received by the service;
        obtain a nonce value for the first subrequest using a nonce determination technique that provides a consistent pseudorandom nonce value for subrequests stemming from a same top-level request;
        determine whether to perform an operation for the first subrequest using a shared request selection technique based at least in part on the nonce value;
    a second subsystem implemented by one or more processors with associated memory, configured to:
        receive a second subrequest stemming from the top-level request of the plurality of top-level requests;
        obtain the nonce value using the nonce determination technique such that the nonce value has a same value for the first subrequest and the second subrequest;
        determine whether to perform the operation for the second subrequest using the shared request selection technique.

2. The system of claim 1, wherein:
    the first subsystem is configured to perform the operation on a first plurality of subrequests based on its determinations of whether to perform the operation;
    the second subsystem is configured to perform the operation on a second plurality of subrequests based on its determinations of whether to perform the operation;
    wherein the operation performed on each of the subrequests impacts corresponding ones of the plurality of top-level requests, the operation on the first plurality of subrequests impacts a first proportion of top-level requests, and the operation on the second plurality of subrequests impacts a second proportion of top-level requests, and
    wherein the determinations of whether to perform the operation by the first and second subsystems are coordinated based on the nonce determination technique and the request selection technique, such that an overall proportion of the plurality of top-level requests that are impacted by performance of the operation by either the first subsystem or the second subsystem is no greater than a larger of the first proportion and the second proportion.

3. The system of claim 1, wherein to determine whether to perform an operation for the first subrequest, the first subsystem is configured to:
    determine that the first subsystem is currently in an overloaded state;
    compare the nonce value to a throttling threshold to determine that the first subrequest should be throttled; and
    throttle the first subrequest.

4. The system of claim 1, wherein to determine whether to perform an operation for the first subrequest, the trace data collection module is configured to:
    compare the nonce value to a trace sampling threshold to determine that trace data should be collected for the first subrequest;
    collect trace data for the first subrequest; and
    store the collected trace data in a trace data store.

5. The system of claim 1, wherein to perform the nonce determination technique, the first subsystem is configured to obtain the nonce value from a parameter of the first subrequest.

6. The system of claim 1, wherein to perform the nonce determination technique, the first subsystem is configured to generate the nonce value using a consistent nonce generation function applied to one or more parameters associated with the first subrequest.

7. A method, comprising:
performing, by a subsystem of a plurality of subsystems:
receiving a subrequest stemming from a top-level request of a plurality of top-level requests received by a top-level subsystem of the plurality of subsystems;
obtaining a nonce value for the subrequest using a nonce determination technique that provides a consistent pseudorandom nonce value for subrequests stemming from a same top-level request; and
determining whether to perform an operation for the subrequest, wherein the determination is made using a request selection technique based at least in part on the nonce value, and the request selection technique is used by one or more other subsystems of the plurality of subsystems that receive subrequests stemming the same top-level request to determine whether to perform the operation on their subrequests.

8. The method of claim 7, further comprising:
performing, by each of the plurality of subsystems, the operation on some of its received subrequests based on its determinations of whether to perform the operation;
wherein the operation, when performed on a particular subrequest, impacts a particular top-level request from which the particular subrequest stems, and the performance of the operation by each of the plurality of subsystems impacts a respective proportion of the plurality of top-level requests; and
wherein the determinations of whether to perform the operation by the plurality of subsystems are coordinated based on the nonce determination technique and the request selection technique, such that an overall proportion of the plurality of top-level requests that are impacted by the performance of the operation by the plurality of subsystems is no greater than a maximum one of the respective proportions of top-level requests impacted individual ones of the plurality of subsystems.

9. The method of claim 7, wherein determining whether to perform an operation for the subrequest comprises comparing the nonce value to a throttling threshold to determine whether the subrequest should be throttled; and further comprising throttling the subrequest in response to a determination that the subrequest should be throttled.

10. The method of claim 7, wherein determining whether to perform an operation for the subrequest comprises comparing the nonce value to a trace sampling threshold to determine whether the trace data should be collected for the subrequest; and further comprising collecting trace data for the subrequest in response to a determination that the trace data should be collected for the subrequest.

11. The method of claim 7, wherein obtaining a nonce value for the subrequest comprises hashing the one or more parameters associated with the subrequest, the one or more parameters comprising one or more of: a client identifier, a session identifier, a source IP address, or a source TCP port number.

12. The method of claim 7, wherein obtaining a nonce value for the subrequest is based at least in part on a request identifier generated for the top-level request.

13. The method of claim 7, wherein obtaining a nonce value for the subrequest comprises generating the nonce value using a nonce generation function applied to a time quantization during which the top-level request is received, wherein the nonce generation function generates a different nonce value for a different time quantization.

14. A non-transitory computer-accessible storage medium storing program instructions that when executed on one or more processors cause the one or more processors to implement a subsystem of a plurality of subsystems, the subsystem configured to:
receive a subrequest stemming from a top-level request;
obtain a nonce value for the subrequest using a nonce determination technique that provides a consistent pseudorandom nonce value for subrequests stemming from a same top-level request; and
determine whether to perform an operation for the subrequest, wherein the determination is made using a request selection technique based at least in part on the nonce value, wherein the request selection technique is used by one or more other ones of the plurality of subsystems to determine whether to perform the operation on subrequests stemming from the same top-level request.

15. The non-transitory computer-accessible storage medium of claim 14,
wherein the subsystem comprises a priority queue for holding received subrequests;
wherein the request selection technique comprises:
prioritizing subrequests in the priority queue based at least in part on the nonce value; and
selecting the subrequest to be throttled based on the priority of the subrequest or a length of time the subrequest has been in the priority queue.

16. The non-transitory computer-accessible storage medium of claim 14, wherein to determine whether to perform an operation for the subrequest, the program instructions when executed on the one or more processors cause the one or more processors to compare the nonce value to a trace sampling threshold to determine whether the trace data should be collected for the subrequest.

17. The non-transitory computer-accessible storage medium of claim 14, wherein to obtain the nonce value, the program instructions when executed on the one or more processors cause the one or more processors to obtain the nonce value from a parameter of the subrequest.

18. The non-transitory computer-accessible storage medium of claim 14, wherein to obtain the nonce value, the program instructions when executed on the one or more processors cause the one or more processors to generate the nonce value based at least in part on a consistent nonce generation function applied to one or more parameters associated with the subrequest.

19. The non-transitory computer-accessible storage medium of claim 18, wherein to generate the nonce value, the program instructions when executed on the one or more processors cause the one or more processors to hash the one or more parameters associated with the subrequest, the one or more parameters comprising one or more of: a client identifier, a session identifier, a source IP address, or a source TCP port number.

20. The non-transitory computer-accessible storage medium of claim 18, wherein to generate the nonce value, the program instructions when executed on the one or more processors cause the one or more processors to generate the nonce value using a nonce generation function, applied to a time quantization during which the top-level request is received, wherein the nonce generation function generates a different nonce value for a different time quantization.

* * * * *